(12) United States Patent
Ono

(10) Patent No.: US 8,219,594 B2
(45) Date of Patent: Jul. 10, 2012

(54) IMAGE PROCESSING APPARATUS, IMAGE PROCESSING METHOD AND STORAGE MEDIUM THAT STORES PROGRAM THEREOF

(75) Inventor: Takashi Ono, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 501 days.

(21) Appl. No.: 12/183,671

(22) Filed: Jul. 31, 2008

(65) Prior Publication Data

US 2009/0037384 A1 Feb. 5, 2009

(30) Foreign Application Priority Data

Aug. 3, 2007 (JP) .................................. 2007-203425

(51) Int. Cl.
*G06F 7/00* (2006.01)
(52) U.S. Cl. ......... 707/803; 707/804; 382/175; 382/243
(58) Field of Classification Search .................. None
See application file for complete search history.

(56) References Cited

U.S. PATENT DOCUMENTS

| 4,737,860 | A | 4/1988 | Ono et al. ...................... 358/298 |
|---|---|---|---|
| 4,969,052 | A | 11/1990 | Ishida et al. ................... 358/457 |
| 5,159,470 | A | 10/1992 | Ishida et al. ................... 358/457 |
| 7,698,627 | B2 | 4/2010 | Asakawa et al. |
| 2005/0065923 | A1* | 3/2005 | Silverbrook et al. ............. 707/3 |
| 2005/0111053 | A1 | 5/2005 | Yoshida et al. ............... 358/448 |
| 2005/0165747 | A1* | 7/2005 | Bargeron et al. ................. 707/3 |
| 2006/0204117 | A1* | 9/2006 | Sekino et al. ................. 382/243 |
| 2006/0253491 | A1* | 11/2006 | Gokturk et al. ............ 707/104.1 |
| 2007/0236723 | A1* | 10/2007 | Gaertner et al. ............. 358/1.15 |

FOREIGN PATENT DOCUMENTS

| JP | 2003-186868 A | 7/2003 |
|---|---|---|
| JP | 2005-159517 | 6/2005 |
| JP | 2006-139382 | 6/2006 |
| JP | 2006-227915 A | 8/2006 |
| JP | 2007-072528 A | 3/2007 |
| JP | 2007-129557 A | 5/2007 |

OTHER PUBLICATIONS

Office Action which issued on Nov. 25, 2011, in counterpart Japanese application No. 2007-203425.

* cited by examiner

*Primary Examiner* — Tim T Vo
*Assistant Examiner* — Anh Tai Tran
(74) *Attorney, Agent, or Firm* — Fitzpatrick, Cella, Harper & Scinto

(57) ABSTRACT

The present invention improves processing speed of search processing of objects. To achieve this, in an image processing apparatus capable of extracting an object contained in input data, and of storing data about the object in a storage device, there are provided a detecting section for detecting a relationship of one or more objects; a section for generating object related information for relating the one or more objects which have a relationship and are detected by the detecting section; a selecting section for selecting a single search type from a plurality of search types; a searching section for searching for the object data stored in the storage device and the object related information in accordance with the search type selected by the selecting section; and a display section for displaying the one or more objects searched in accordance with the object relating information searched by the searching section.

8 Claims, 19 Drawing Sheets

IMAGE PROCESSING APPARATUS, IMAGE PROCESSING METHOD AND STORAGE MEDIUM THAT STORES PROGRAM THEREOF

BACKGROUND OF THE INVENTION

1. Field of the Invention

The present invention relates to an image processing apparatus and image processing method that separate an object from input data such as print data and image data obtained by reading an original document, and diverts the obtained object data to another document by using a searching function and editing function.

2. Description of the Related Art

Copying machines, in recent years, have become multi-functional at a remarkable speed due to digitization of internal processing. Citing only basic functions, there is a copy function for copying an original document and a PDL function for enabling printing of a document created by a host computer. In addition, there is a SEND function for transmitting an original document outside of the copying machine via a network and a BOX function for storing an original document image generated by the copy function or PDL function in the copying machine to enable reuse thereof. Furthermore, there are almost countless functions such as an editing function for combining and bookbinding using original document images stored inside the copying machine by the BOX function.

On the other hand, there is a growing demand for image quality, and a strong demands for high quality reproducibility of an original document causes an ever increasing image processing resolution in the copying machine from 600 dpi to 1200 dpi and to 2400 dpi, and an ever increasing number of bits of signals from 8 bits to 10 bits to 12 bits. This results in conditions in which the cost of equipment or development cannot be ignored due to the addition of a memory or storage for storing bitmap data for internal processing of an enormous amount of information, and due to replacement by a high performance CPU.

To make use of the editing function under such circumstances, an original read document is divided on an object unit basis so that the individual objects contained in the original document are divided in accordance with attributes such as TEXT, GRAPHIC and IMAGE. For example, as a technique disclosed in Japanese Patent Laid-Open No. 2005-159517, objects are converted with the attributes of TEXT and GRAPHIC to vector data by vectorization, converts objects with IMAGE attribute to JPEG, and then utilizes the editing function. This makes it possible to reproduce a high quality image without handling high resolution, multiple bit bitmap data with an enormous amount of information. In addition, since cost reduction and improved operation can be expected by using vector data that facilitates editing and modification, image quality and convenience are further improved.

The search function disclosed in Japanese Patent Laid-Open No. 2006-139382, for example, can retrieve desired data efficiently by managing data by categorizing data into folders and by inputting information about category selection and contents to be retrieved.

SUMMARY OF THE INVENTION

The foregoing conventional techniques, however, carry out editing after completing the division of the original document that was read into object units, adaptive conversion to vector data or JPEG, and searching for the objects. In such a case, to prepare the objects required for editing, the object search must be performed frequently.

In addition, since the time required for the search processing increases with the number of objects stored, a user wastes a lot of time.

To solve the foregoing problems, an image processing apparatus in accordance with the present invention is configured as follows.

In the first aspect of the present invention, there is provided an image processing apparatus capable of extracting an object contained in input data, and of storing data about the object in a storage device, the image processing apparatus comprising: detecting means for detecting a relationship of one or more objects; means for generating object related information for relating the one or more objects which have a relationship and are detected by the detecting means; selecting means for selecting a single search type from a plurality of search types; searching means for searching for the object data stored in the storage device and the object related information in accordance with the search type selected by the selecting means; and display means for displaying, in accordance with the object relating information searched by the searching means, the one or more objects searched.

In the second aspect of the present invention, there is provided an image processing method executed by a data processing section of an image processing apparatus capable of extracting an object contained in input data, and of storing data about the object in a storage device, the image processing method comprising: a detecting step of detecting a relationship of one or more objects; a step of generating object related information for relating the one or more objects which have a relationship and are detected by the detecting step; a selecting step of accepting selection of a single search type from a plurality of search types; a step of searching for the object data stored in the storage device and the object related information in accordance with the search type selected at the selecting step; and a step of displaying, in accordance with the object related information searched by the step of searching, the one or more objects searched.

In the third aspect of the present invention, there is provided a computer readable storage medium that records a program to be executed by a data processing section of an image processing apparatus capable of extracting an object contained in input data, and of storing data about the object in a storage device, the program causing the data processing section to execute: a detecting step of detecting a relationship of one or more objects; a step of generating object related information for relating the one or more objects which have a relationship and are detected by the detecting step; a selecting step of accepting selection of a single search type from a plurality of search types; a step of searching for the object data stored in the storage device and the object related information in accordance with the search type selected at the selecting step; and a step of displaying, in accordance with the object related information searched by the step of searching, the one or more objects searched.

In the present specification, the term "image processing apparatus" includes, in addition to dedicated image processing apparatuses and image forming apparatuses, general-purpose information processing apparatuses capable of executing the processing in accordance with the present invention.

According to the present invention, it is possible to detect relationships between object data from names, positions, sizes and the like of the objects, which are obtained at the time of separating the objects, and to generate group information automatically by considering the related objects as one group.

Utilizing the group information makes it possible to improve the processing speed of the search processing for the objects and to make it more convenience for a user to searches for the objects.

Further features of the present invention will become apparent from the following description of exemplary embodiments (with reference to the attached drawings).

DESCRIPTION OF THE EMBODIMENTS

[First Embodiment]

Figure 1:
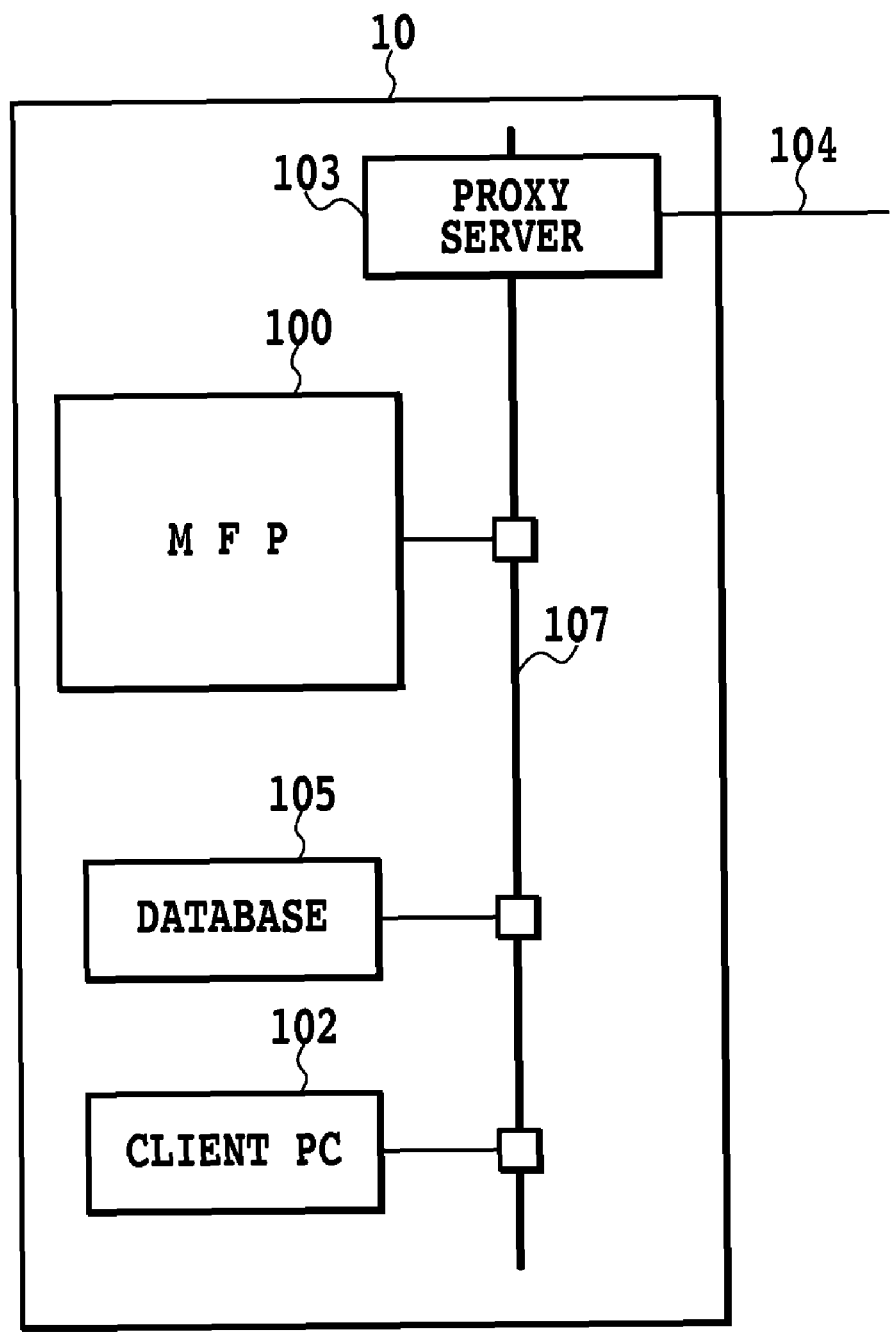
FIG. 1 is a block diagram showing a configuration of an image processing system of a first embodiment in accordance with the present invention.

A first embodiment in accordance with the present invention will now be described in detail with reference to the accompanying drawings. FIG. 1 is a block diagram showing a configuration of an image processing system of the first embodiment in accordance with the present invention.

The image processing system is implemented in an environment in which an office 10 is connected to a network 104 such as the Internet.

An MFP (MultiFunction Peripheral) 100, a multifunction machine that implements a plurality of functions (copying function, printing function, transmitting function and the like), is connected to a LAN 107 in an office 10. In addition, a client PC 102 using the MFP 100, a database 105, and a proxy server 103 are also connected. Furthermore, the LAN 107 in the office 10 is connected to the network 104 via the proxy server 103 of each office.

The configuration shown in FIG. 1 is an example, and a plurality of offices 10 can be present. As for the network 104, it can be a single network or a combination of various types of communication networks capable of transmitting and receiving data. Various types of communication networks include telephone circuits, LANs, WANs, dedicated digital lines, ATM lines, frame relay lines, communications satellite circuits, cable television circuits, data broadcasting radio circuits and the like.

In addition, a variety of terminals represented as the client PC 102 have standard components provided in a general-purpose computer. Such components include a CPU, a RAM, a ROM, a hard disk, an external storage device, a network interface, a display, a keyboard and a mouse, for example.

Figure 2:
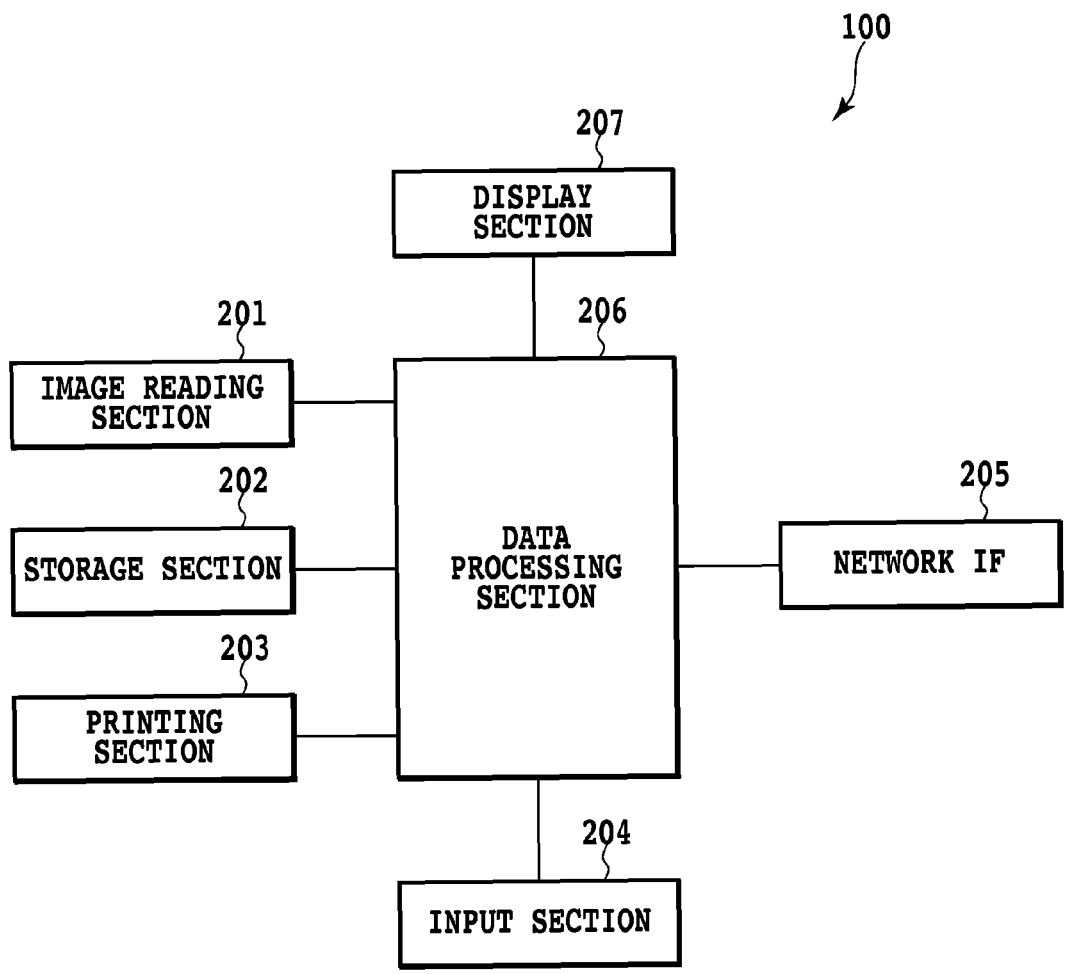
FIG. 2 is a block diagram showing a detailed configuration of an MFP (multifunction peripheral) which is the first embodiment in accordance with the present invention.

Next, a detailed configuration of the MFP 100 will be described with reference to FIG. 2. FIG. 2 is a block diagram showing a detailed configuration of the MFP constituting the first embodiment in accordance with the present invention.

In FIG. 2, in an image reading section 201 including an automatic document feeder (ADF), a bundle or a single original document image is irradiated with light from a light source (not shown), and a reflected image of the original document is formed on a solid-state image sensing device via lenses. Thus, a bitmap-like image read signal output from the solid-state image sensing device is acquired as bitmap data with a prescribed resolution (such as 600 dpi).

In addition, the MFP 100 has a copying function of printing an image corresponding to the image read signal on a recording medium by a printing section 203. When making a single copy of the original document image, a data processing section 206 performs the image processing of the image read signal to generate a recording signal. In accordance with the recording signal, the printing section 203 carries out the printing on a recording medium. In contrast, when making a plurality of copies of the original document image, the data processing section 206 causes a storage section 202 to temporarily retain the recording signal of one page, and causes the printing section 203 to print it on recording mediums with sequentially outputting the recording signal thereto.

As for the communications function via a network I/F 205, data processing section 206 converts the bitmap data acquired from the image reading section 201 to the object data through the processing which will be described later, and transmits the data to the database 105. In addition, data processing section 206 receives the object data stored in the database 105 for reuse. Furthermore, data processing section 206 converts the object data to an image file with a vector data file format such as XPS and PDF, and transfers the object data to the client PC 102.

As for the printing function of the printing section 203, the data processing section 206 receives the print data output from the client PC 102 via a network IF 205, for example. After converting the print data to a recording signal for printing by the printing section 203, the data processing section 206 sends the recording signal to the printing section 203. Then, the printing section 203 forms an image on a print medium.

Operation instructions to the MFP 100 are provided from an input section 204 mounted on the MFP 100, and the operation corresponding to the instructions is controlled by a control section (not shown) in the data processing section 206. In addition, a display section 207 displays the state of the operation input and the image data during the processing.

The storage section 202 provides a storage area for storing the object data acquired by processing which will be described later, and an area for storing information that associate a plurality of object data which will be described later. In addition, the storage section provides buffers, which are used during various image processing in the data processing section. Furthermore, the storage section provides buffers for image editing, which store copy data of the object data as image editing data when performing image editing based on the object data.

[Processing Outline]

Next, an outline of the entire processing executed by the image processing system in the present embodiment will be described with reference to FIG. 3.

Figure 3:
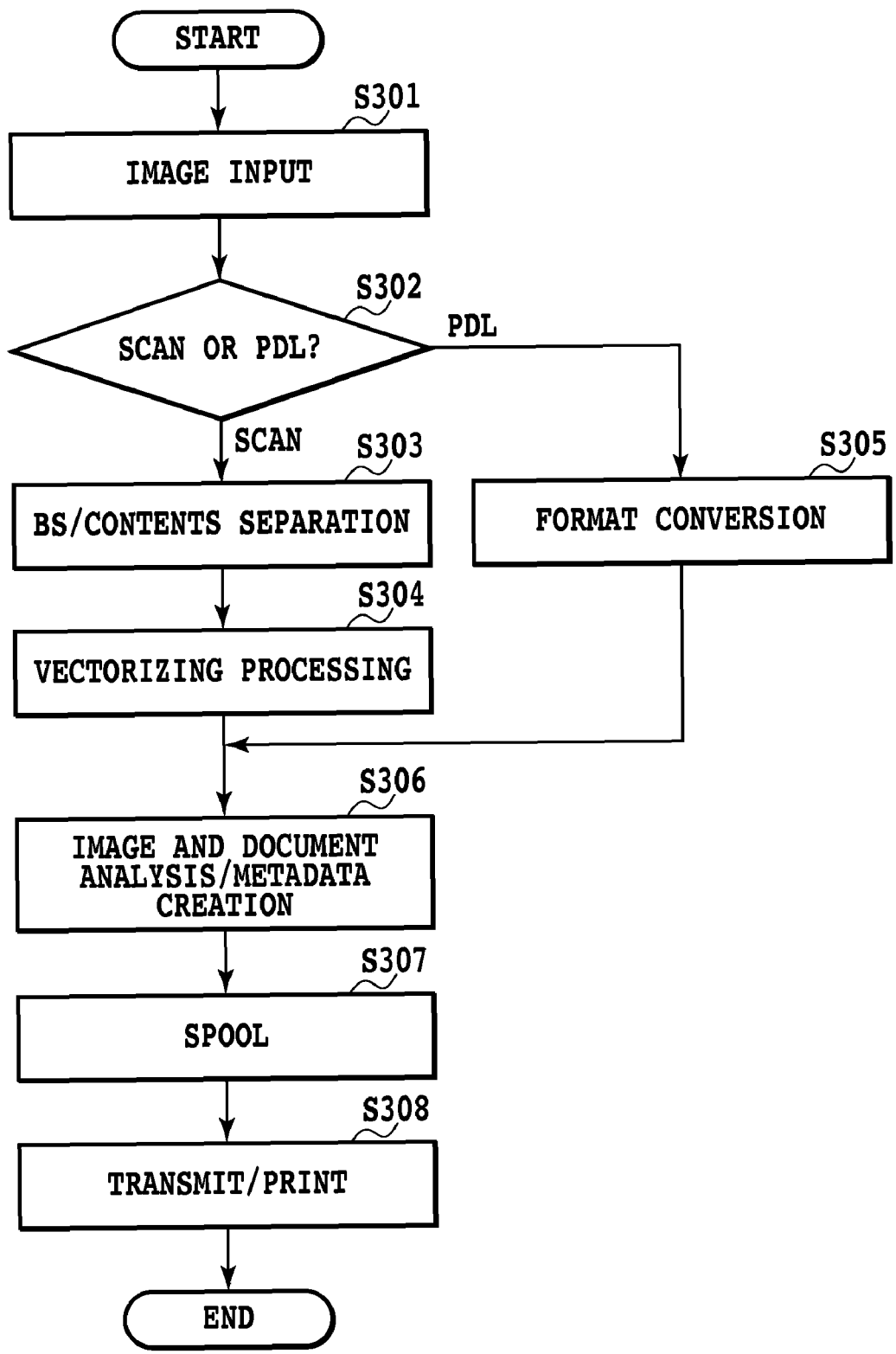
FIG. 3 is a flowchart showing an outline of the overall processing executed by the image processing system of the first embodiment in accordance with the present invention.

FIG. 3 is a flowchart showing an outline of the entire processing. The flowchart is executed in response to a user instruction such as transmission processing (FAX transmission and E-mail transmission), print processing and copy processing. Here, the image of the original document to be processed is scanned and input by a scanner, or is input in a PDL format from another client PC via the network.

First, at step S301, when the input is a scan job, the image reading section 201 of the MFP 100 scans the original document to read it in a bitmap, and acquires a 600 dpi, 8 bit image signal, for example. The data processing section 206 performs prescribed preprocessing of the image signal, and stores it in the storage section 202 as image data (bitmap data) of one page. When the input is PDL data described in a page description language (referred to as "PDL" from now on), the image data (vector data) of one page is stored in the PDL.

Next, when the input is a scan job, a decision "SCAN" is made at step S302, and the processing proceeds to step S303. At step S303, the data processing section 206 carries out block selection (BS) and then contents separating processing. More specifically, the data processing section 206 divides the image data to be processed, which the storage section 202 stores, into text/graphic portions and halftone image portions. The data processing section further divides the text/graphic portions into blocks, each of which is treated as a paragraph, or into tables and figures consisting of lines, and converts them to objects.

On the other hand, the data processing section 206 divides the halftone image portions into objects (blocks) independent from each other as the blocks, such as image portions and background portions, which consist of blocks separated in rectangles.

Although the present embodiment takes TEXT (text), GRAPHIC (thin line, figure and table) and IMAGE (image) as an example of the attributes, the types of attributes are not limited thereto. Other types of attributes can be employed in accordance with applications or purposes. In addition, it is not necessary to use all the attributes. In this way, the block selection processing (region dividing processing) divides the input image into regions (blocks) in accordance with the attributes.

Next, at step S304, vectorizing processing is performed on each separated object. The vectorizing processing carries out character recognition of the objects decided as TEXT attribute with an OCR, recognizes size, style and font of the characters, and converts to visually faithful font data corresponding to the characters obtained by scanning the original document. On the other hand, for objects such as tables and figures consisting of lines with the GRAPHIC attribute, the vectorizing processing outlines the objects. In addition, for the image objects with IMAGE attribute, the vectorizing processing carries out JPEG compression individually as image data. Although the present embodiment assumes that a result of performing the vectorizing processing of the text object (text region) is expressed in terms of character code, font data (vector data of the font), font size and style obtained as a result of the character recognition, this is not essential. For example, the present embodiment can extract contours (outlines) of the character image, and generate the vector data from the contours.

The vectorizing processing on the various objects are executed in accordance with the attribute information of the individual objects, and the results thereof are stored as the object data with a format consisting of the metadata and image information which will be described later and available in the MFP 100.

In contrast, when the input is PDL data, a decision "PDL" is made at step S302 and the processing proceeds to step S305. At step S305, the input PDL data undergoes format conversion to object data on an object by object basis, which will be described later, and the object data are stored. In the course of this process, the attribute data (such as TEXT, GRAPHIC and IMAGE) and the metadata contained in the PDL data are also converted and stored. The term "metadata" mentioned here refers to the information on the object such as characteristics and names of the objects and to the object relating information connecting a plurality of objects.

Next, at step S306, the data processing section 206 performs image analysis and document analysis object by object, and carries out correction of the metadata generated at step S304 and step S305 with the addition of new information. First, considering that the SCAN job and PDL job generate different attribute information, the present embodiment prepares the three attributes of TEXT, GRAPHIC and IMAGE so that the same sort of image data undergo the same processing from this point forward. When the attribute of the object is TEXT, a summary of the document is made from the results of the document analysis and is added to the metadata. When the attribute information is GRAPHIC, the image analysis is made to extract more detailed information such as a name, diagram and line drawing, and the information is added to the metadata. When the attribute information is IMAGE, the image analysis or similar image search is carried out to extract more detailed information such as a name, portrait and landscape, and the information is added to the metadata. The information added to the metadata here is only an example, and is not limited thereto. Any information can be added as long as it relates to the individual objects.

Next, at step S307, the object data acquired in the processing up to step S306 are spooled in the storage section 202, and at the same time are stored in the storage section 202 or database 105 so as to be reusable. The object data is not necessarily registered. For example, another decision processing can be made as to whether the object data is to be registered or not, such as it is not registered if the storage section 202 has already registered the same or similar object data.

Next, at step S308, the transmission processing or printing processing which will be described later is performed. If the process of registering the object data to the storage section 202 or database 105 is designated, the processing is completed here without carrying out the transmission processing or print processing.

[Transmission Processing]

Next, the outline of the transmission processing performed in the image processing system of the present embodiment will be described with reference to FIG. 4.

Figure 4:
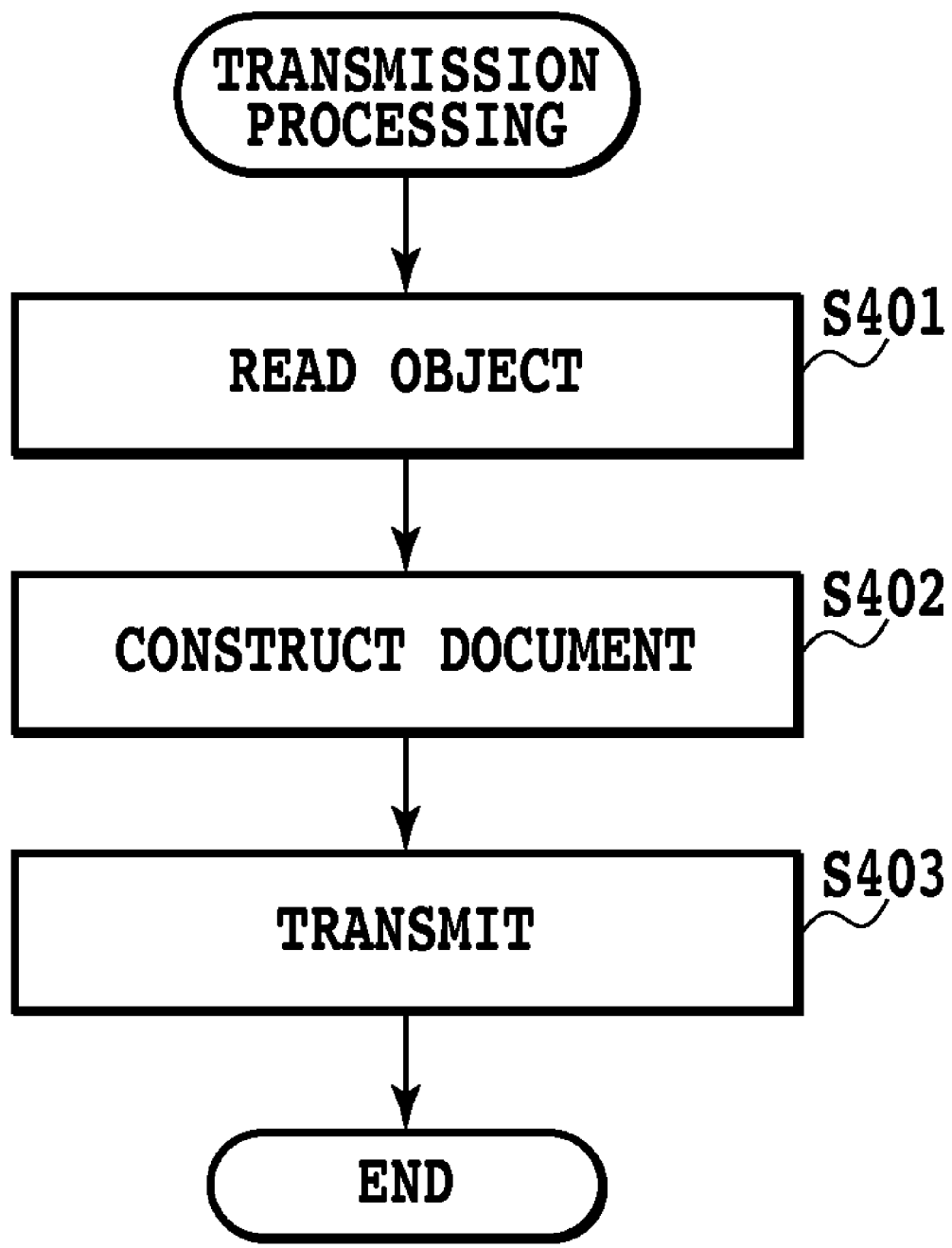
FIG. 4 is a flowchart showing an outline of the transmission processing of the first embodiment in accordance with the present invention.

FIG. 4 is a flowchart showing the outline of the transmission processing in the present embodiment.

First, at step S401, the object data spooled in the storage section 202 is read.

Next, at step S402, a document to be the print information is constructed based on the layout information which the object data possesses.

Next, at step S403, the constructed document information is converted to any given external format, and is transmitted to a destination via the network I/F 205. As the "external format" mentioned here, TIFF and JPEG are available as a bitmap format and PDF and XPS as a vector format, for example.

[Printing Processing]

Figure 5:
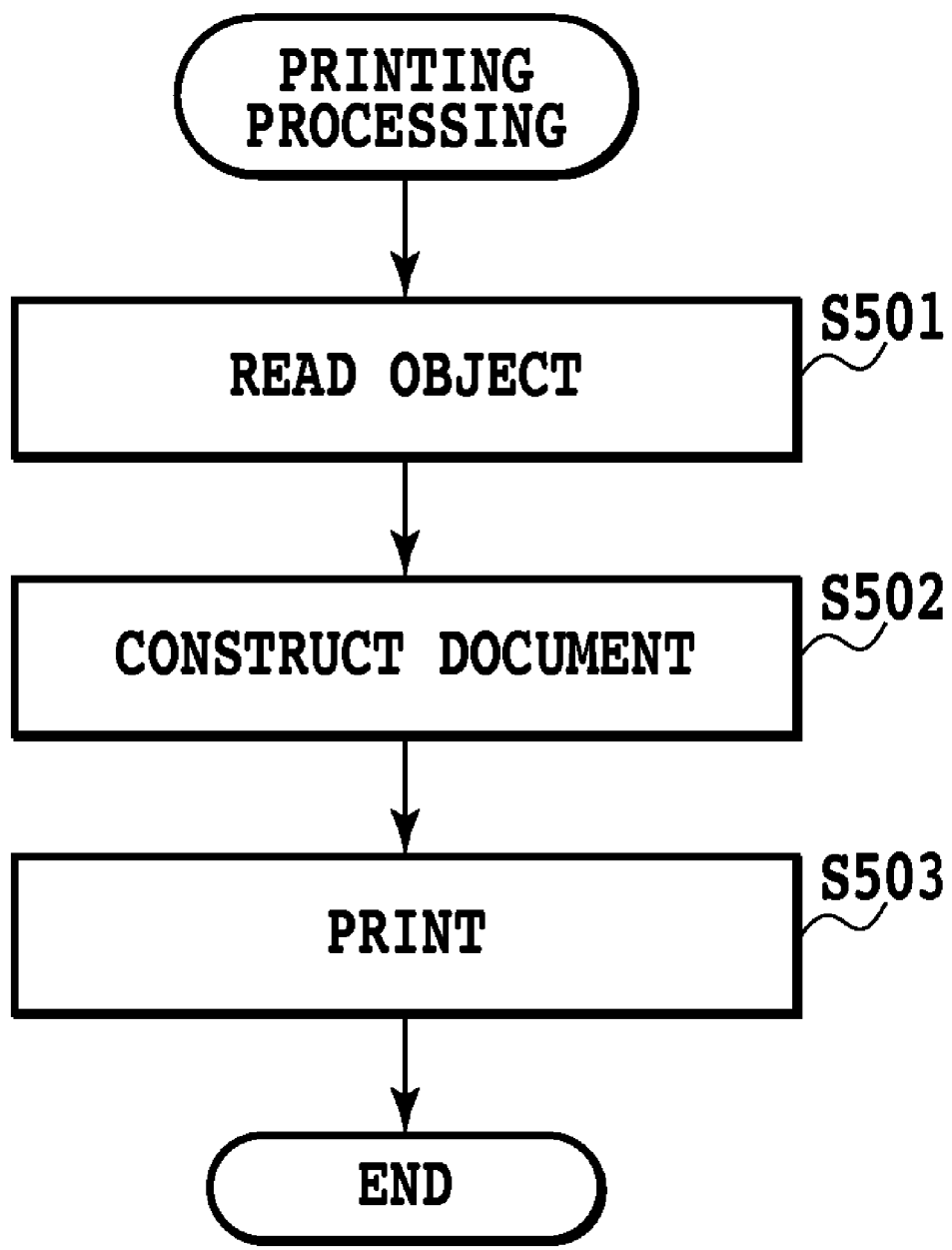
FIG. 5 is a flowchart showing an outline of the printing processing of the first embodiment in accordance with the present invention.

Next, the outline of the printing processing performed in the image processing system of the present embodiment will be described with reference to FIG. 5.

First, at step S501, the object data spooled in the storage section 202 is read.

Next, at step S502, a document to become the print data is constructed based on the layout information of the object data possesses.

Next, at step S503, the print data is provided to the printing section 203 after having been converted to a recording signal with which the printing section 203 can print. Thus, the printing section 203 forms the image on a print medium.

[Object Data and Metadata]

Figure 6:
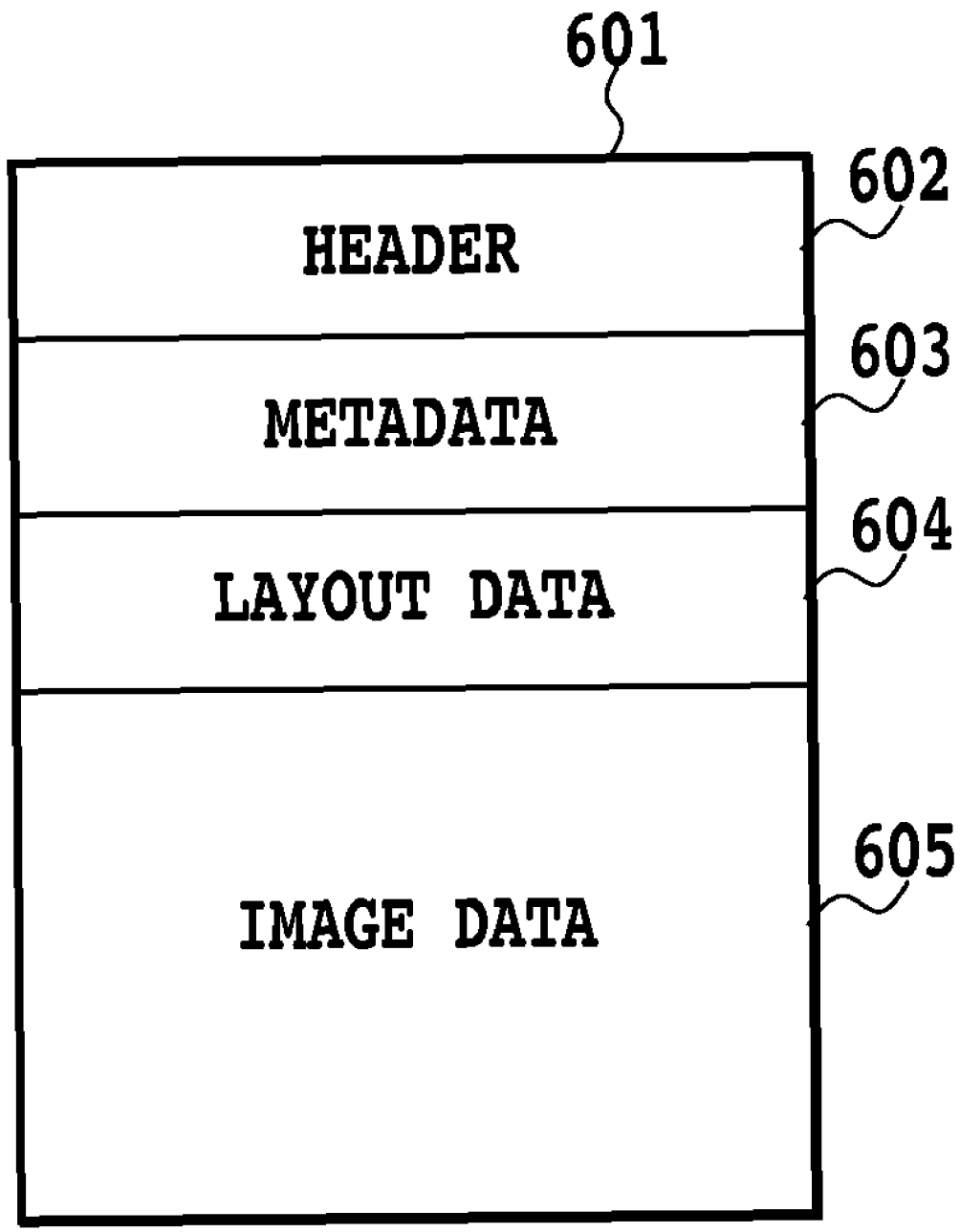
FIG. 6 is a diagram showing an example of a structure of the object data of the first embodiment in accordance with the present invention.

Here, the object data and metadata will be described with reference to FIG. 6 and FIG. 7. FIG. 6 is a diagram showing an example of the structure of the object data in the present embodiment.

The object data 601 comprises a header 602, metadata 603, layout data 604 and image data 605. The header 602 stores the size of the object such as width and height of the object data, and a data format such as bitmap or vector. The metadata 603 stores information on the object data such as the attribute of the object, the information for search and editing, and the object ID. The layout data 604 stores information indicating the position of the object data itself in the original document. The image data 605 is real data of the object, and is represented in the bitmap format or vector format designated by the header.

Figure 7A:
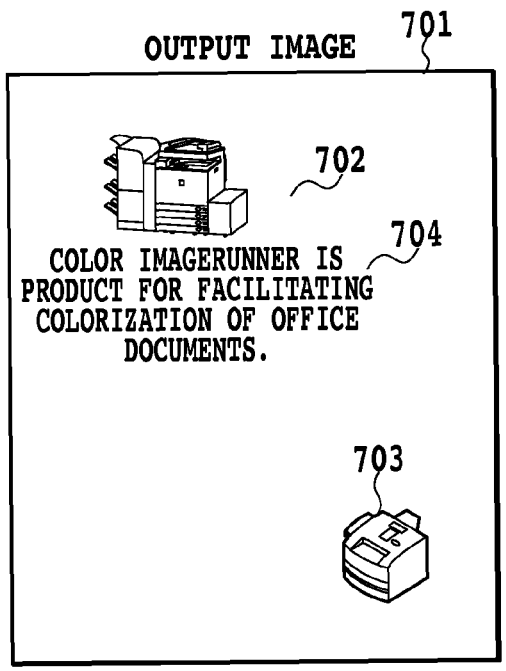
FIG. 7A is a diagram showing an output image in the first embodiment in accordance with the present invention.
Figure 7B:
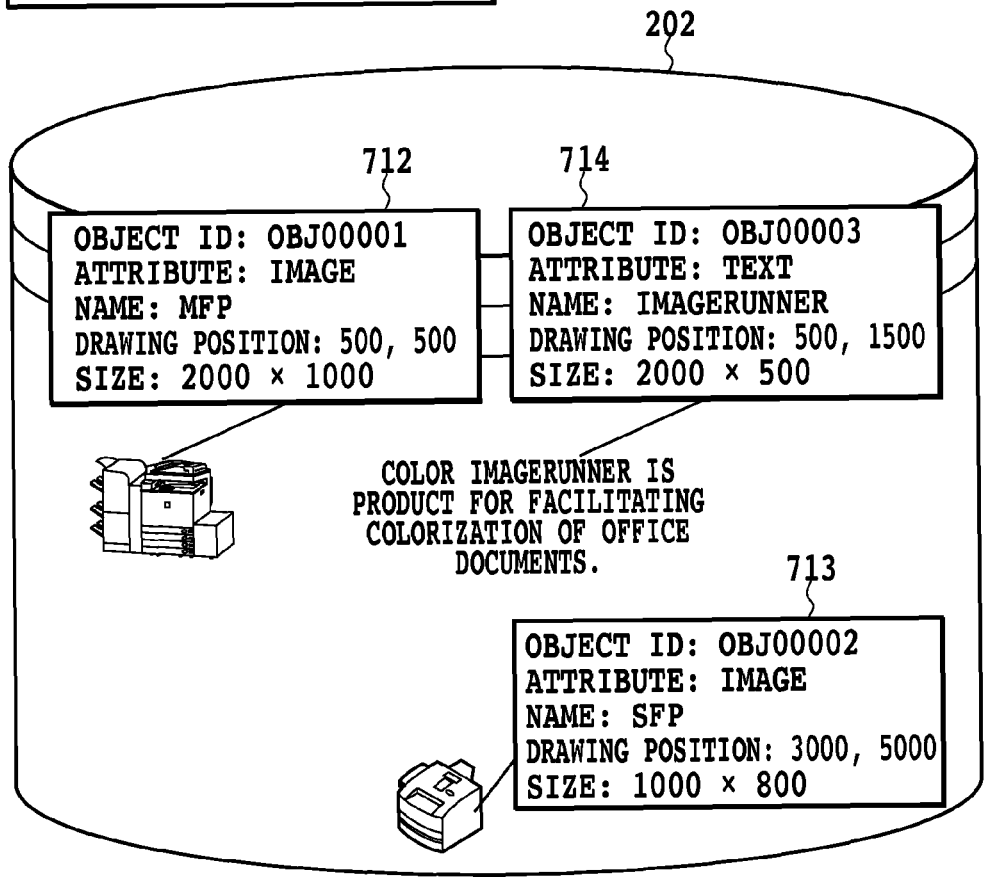
FIG. 7B is a diagram showing an example of registered or spooled object data corresponding to the output image and metadata associated with it.

Next, a more detailed description will be made with reference to FIGS. 7A and 7B. FIGS. 7A and 7B are diagrams showing an example of the object data registered or spooled in the storage section 202, and the metadata associated with it in the present embodiment.

The storage section 202 registers, as to the output image 701 shown in FIG. 7A, the individual object data 702, 703 and 704 shown in FIG. 7A, which are separated by the block selection processing at step S303. In this case, the individual object data are provided with the metadata 712, 713 and 714 shown in FIG. 7B and registered. The metadata 712, 713 and 714 each include the object ID, the attribute of the object data, the name of the object data, and the layout information such as a drawing position and size. The object ID is uniquely defined for each object data.

[Function Selection]

Next, the function selecting operation in the MFP 100 of the present embodiment and the behavior corresponding thereto will be described with reference to the drawings.

Figure 8:
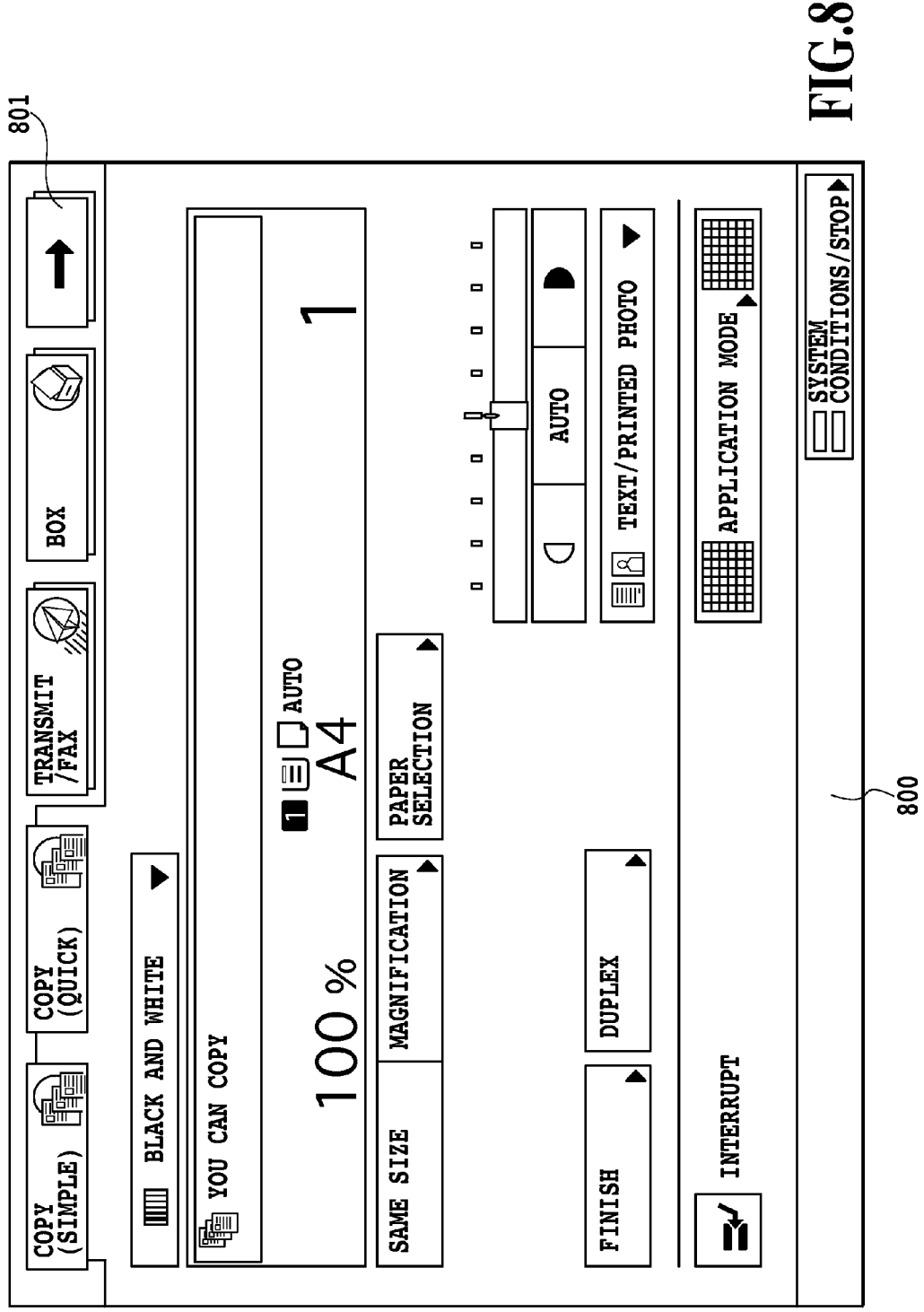
FIG. 8 is a diagram showing an example of an operation screen of the first embodiment in accordance with the present invention.

The operation screen 800 of FIG. 8 is a basic operation screen of the MFP 100 of the present embodiment. The selection of one of the various functions implemented in the present embodiment is assumed to be in an expansion function key 801 in the example of the operation screen 800.

Figure 9:
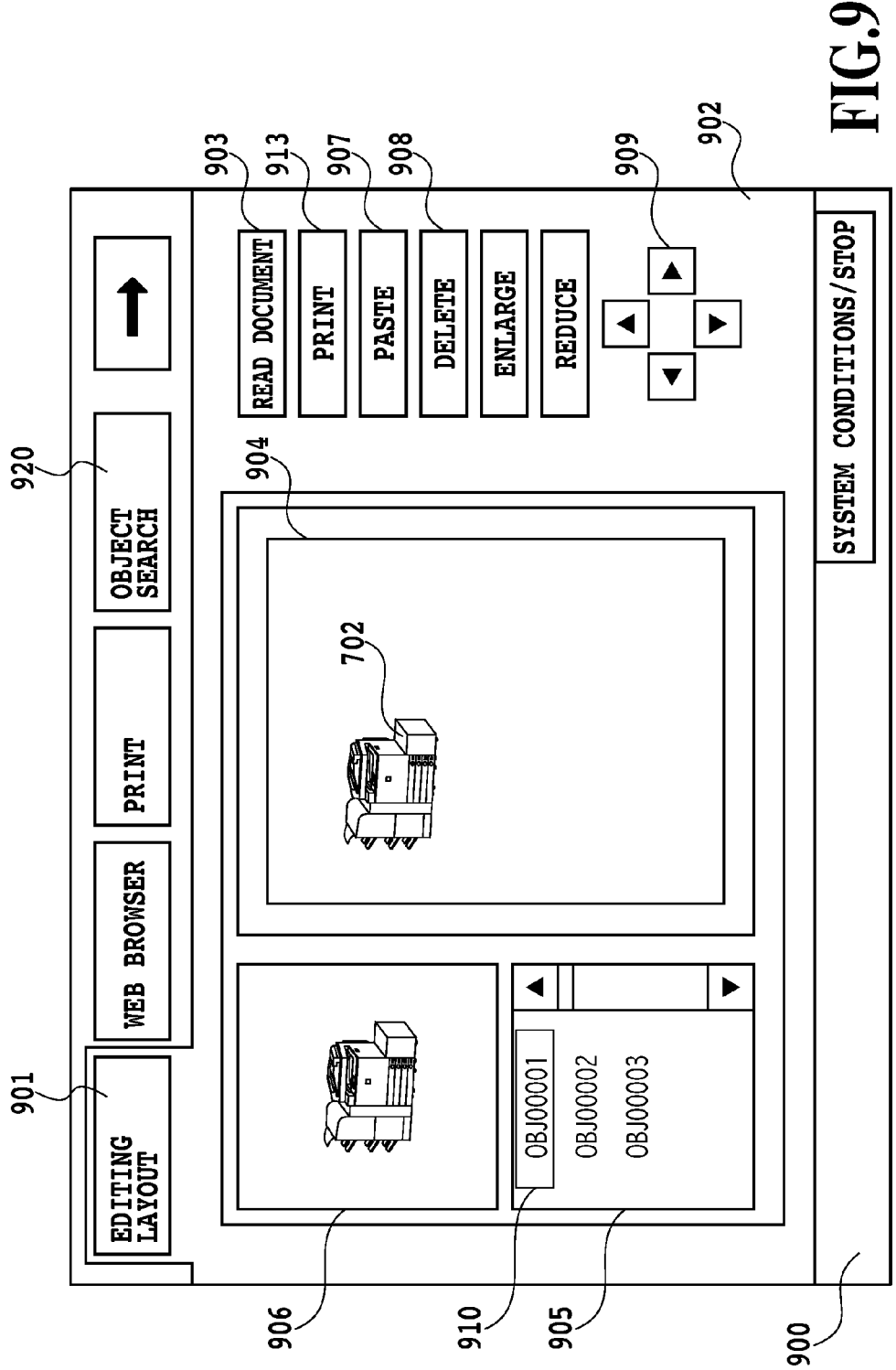
FIG. 9 is a diagram showing an example of an expansion function operation screen of the first embodiment in accordance with the present invention.

By pressing the expansion function key 801, the operation screen 800 is switched to an expansion function operation screen 900 of FIG. 9, which enables the selection of the various functions prepared in the MFP 100 as the expansion functions.

In the expansion function operation screen 900 of FIG. 9, if the editing layout key 901 is pressed, an editing layout window 902 is displayed.

The original document reading key 903 of the editing layout window 902 is a key for reading the original document. If the original document reading key 903 is pressed, the processing shown in the flowchart of FIG. 3 described previously is executed so that a preview window 904 shows the reading result. In this case, in the preview window 904, the object data described previously, which are subjected to the object separation and vectorization by the process of FIG. 3, is displayed after having been rearranged in accordance with the layout data 604. Here, the following processing can be executed without pressing the original document reading key.

In the editing layout window 902, an object list window 905 displays a list of the object IDs as the information on the object data registered in the storage section 202 or database 105. In addition, in the editing layout window 902, an object preview window 906 displays a preview of the object optionally selected in the object list window 905. The window 906 is a window for drawing the image data 605 of the object data registered or spooled in the storage section 202, and for enabling the user to confirm its contents. Here, the information on the object data to be displayed in the list in the object list window is not limited to the object IDs. It can be part of the metadata 603, or image data 605.

In addition, it is also possible to display only the object data (and the data associated with the object) searched by conducting the object search for the registered object data, which will be described later. The object search can be performed by pressing an object search key 920 so as to display an object search window 1002 of FIG. 10 (whose details will be described later) shown as an example.

The object data optionally selected in the object list window 905 is subjected to paste processing by pressing a paste button 907. The result is displayed in the preview window 904. In addition, the pasted object data and the object data in the document are deleted from the document if the user presses a delete button 908 after the user selects the object data in the preview window.

Shift buttons 909 are for shifting the object data to any desired position in response to the user's actuation after optionally selecting the object data displayed on the preview window.

If a print button 913 is pressed, the foregoing print processing is started from the object data displayed on the preview window 906.

[Generation of Group Information]

Next, a method of detecting the relationship (connection) between the object data in the present embodiment will be described in detail with reference to FIG. 12 and FIGS. 13A and 13B.

Figure 12:
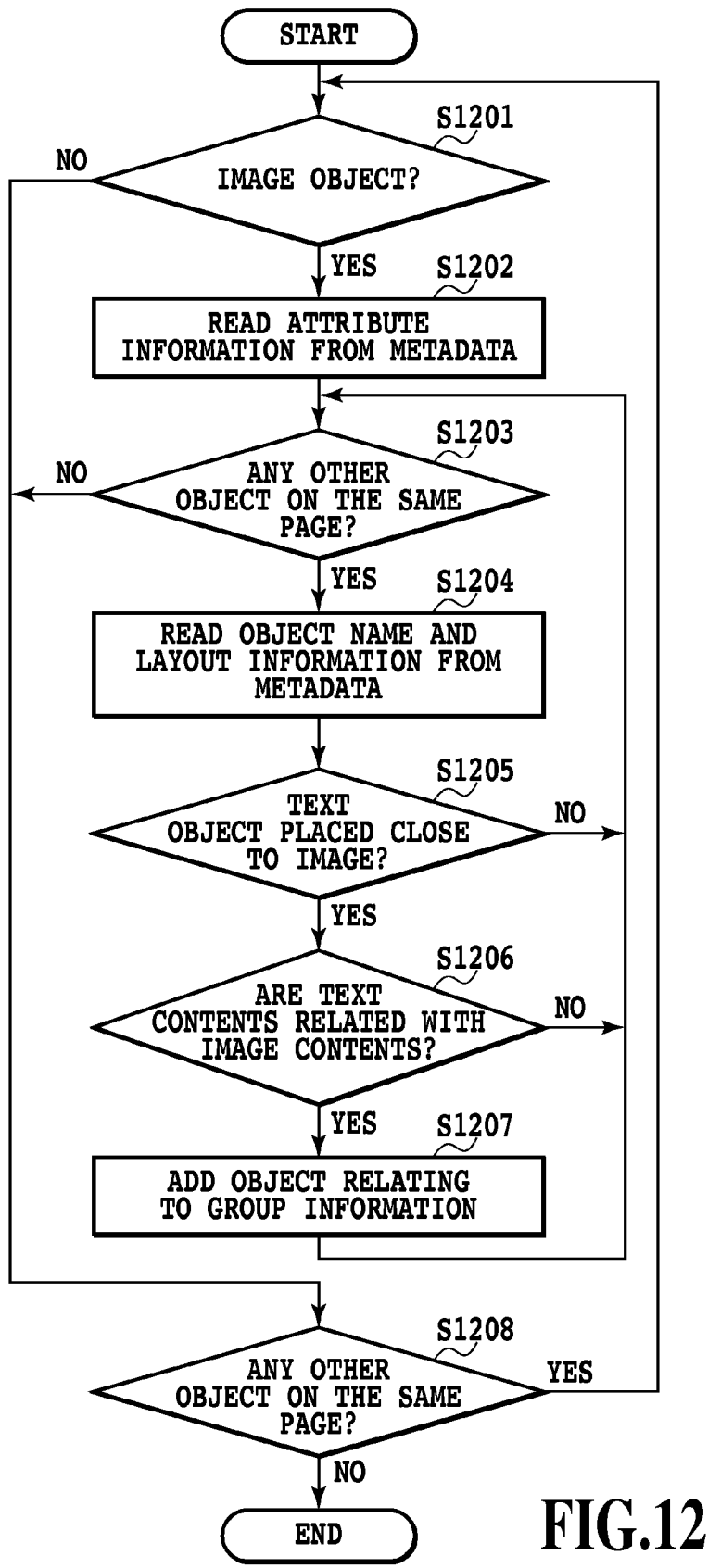
FIG. 12 is a flowchart of group information generating processing in the first embodiment in accordance with the present invention.

FIG. 12 is a flowchart of the group information generating processing in the present embodiment. FIGS. 13A and 13B show the output image 701 of the original document that is read in advance, and an example of the metadata of the object data that is read in advance and stored in the storage section 202.

Figure 13A:
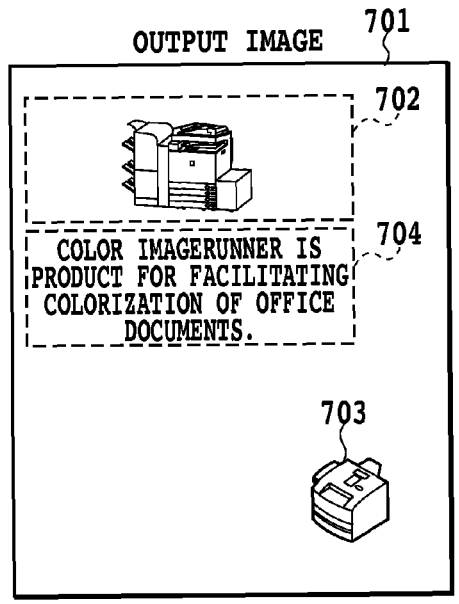
FIG. 13A is a diagram showing an output image of an original document read in advance in the first embodiment in accordance with the present invention.
Figure 13B:
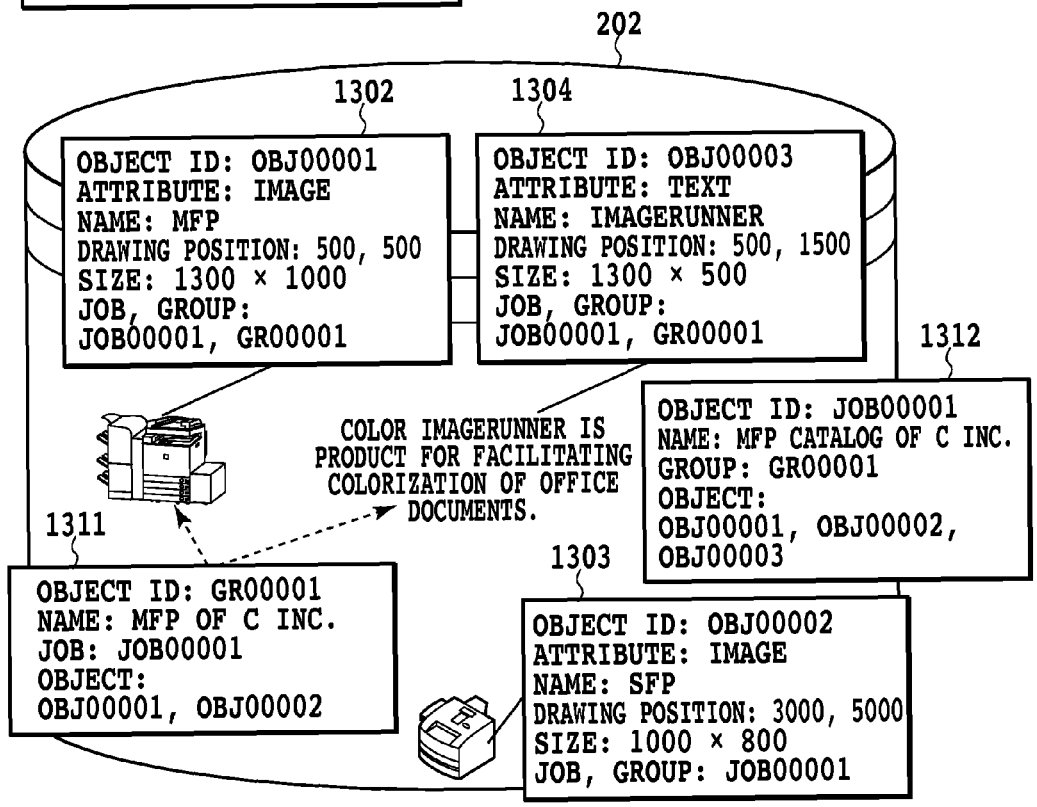
FIG. 13B is a diagram showing an example of the metadata of the registered or spooled object data corresponding to the output image.

The output image 701 shown in FIG. 13A consists of the objects 702, 703 and 704 shown in the same figure. At step S1201, a decision is made as to whether the object 702 is an image object or not. If the decision of the image object is made, the attribute information of the metadata 1302 (FIG. 13B) of the object 702 is read at step S1202. In this case, the attribute of the object 702 of the output image 701 is an image. Unless the object decided initially at step S1201 is an image object, the processing proceeds to step S1208 at which a decision is made whether another object is present on the same page or not, and loops back to step S1201 if there is any.

Next, at step S1203 next to step S1202, a decision is made whether any other object is present on the same page or not. The output image 701 further includes the objects 703 and 704. Accordingly, a decision is made that the object is present on the same page, and at step S1204, from the metadata 1302 of the object 702, the name of the object and the layout information such as the drawing position and size are read. Here, the name of the object 702 is "MFP", the drawing position is (500, 500), and the size is 1300×1000.

Subsequently, at step S1205, the attribute information of the metadata 1303 (FIG. 13B) of the object 703 is read, and a decision is made as to whether the object 703 is a text object or not. Since the attribute of the object 703 is not text, the processing loops back to step S1203. At step S1203, a decision is made as to whether any other object is present on the same page or not. Since the object 704 is present here, the attribute information of the metadata 1304 (FIG. 13B) of the object 704 is read at step S1204. In this case, since the attribute of the object 704 is text, the name of the object and the layout information such as the drawing position and size are read from the metadata 1304 at step 1204. Here, the name of the object 704 is "imageRunner", the drawing position is 500×1500, and the size is 1300×500.

Subsequently, at steps S1205 and S1206, a decision is made as to whether the text object is placed near the image, and whether its name relates to the name of the image object. As to the decision whether the object is placed near or not, an example of the decision conditions is as follows.

Assume that the width of the image object is imgWd, its height is imgHt, and the drawing position is imgX, imgY; the width of the text object is txtWd, its height is txtHt, and the drawing position is txtX, txtY; and a threshold is $\alpha$. Then $imgY-(txtY+txtHt)<\alpha$ and $imgX<txtX$ and $imgX+imgWd>txtX$ or $imgY-(txtY+txtHt)<\alpha$ and $imgX<txtX+txtWd$ and $imgX+imgWd>txtX+txtWd$ $(imgY+imgHt)-txtY<\alpha$ and $imgX<txtX$ and $imgX+imgWd>txtX$ or $(imgY+imgHt)-txtY<\alpha$ and $imgX<txtX+txtWd$ and $imgX+imgWd>txtX+txtWd$ $imgX-(txtX+txtWd)<\alpha$ and $imgY<txtY$ and $imgY+imgHt>txtY$ or $imgX-(txtX+txtWd)<\alpha$ and $imgY<txtY+txtHt$ and $imgY+imgHt>txtY+txtHt$ $(imgX+imgWd)-txtX<\alpha$ and $imgY<txtY$ and $imgY+imgHt>txtY$ or $(imgX+imgWd)-txtX<\alpha$ and $imgY<txtY+txtHt$ and $imgY+imgHt>txtY+txtHt$ The conditions set values of lines tangent to a rectangle enclosing the object, or set a certain threshold, and check whether the object is within the range.

As a result of the check, a decision is made that the object 702 and the object 704 meet the foregoing conditions, and their names have a relation. As for the relationship between the names, it can be decided from the fact that part of or all of the names are common and the like. It can also be decided by providing a separate table for deciding the relationships, which ties the related character strings. In the foregoing example, it is assumed that the name "MFP" of the object 702 has a relationship with the name "imageRunner" of the object 704. Unless the relationship is present, the processing loops back to step S1203.

Subsequently, at step S1207, the metadata 1311 shown in FIG. 13B, which will become the group information, is generated. If the metadata 1311 is already present, the information is added thereto. The group information includes the object ID indicating the group, and all related object IDs.

For the object 703, which is an image object, the detecting processing is also carried out. However, since it does not have any related objects, the group information is not generated.

[Details of Search Processing]

Next, the search processing in the present embodiment will be described in detail with reference to FIG. 10, FIG. 11, FIG. 14A, FIG. 14B and FIG. 15.

Figure 10:
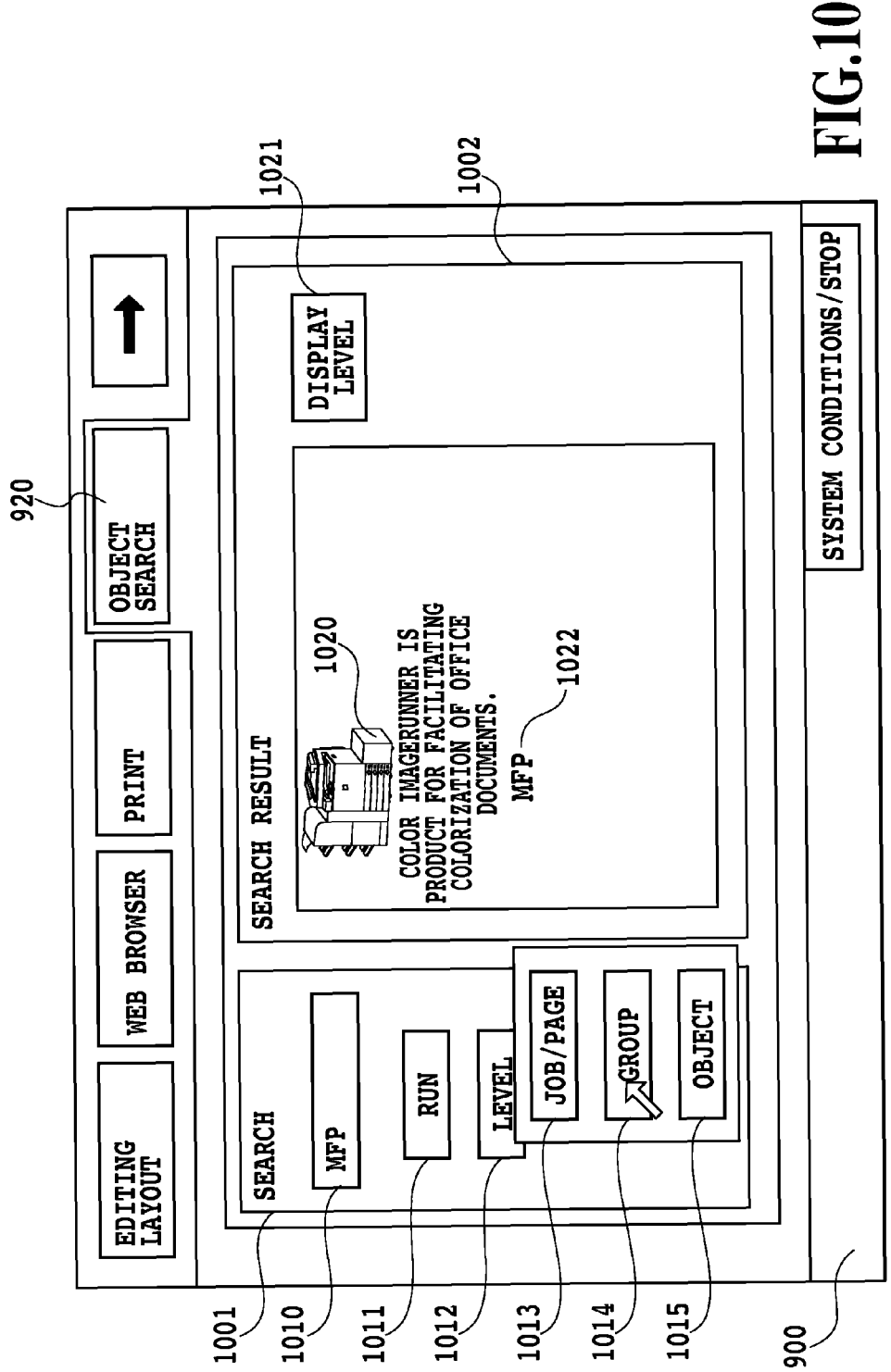
FIG. 10 is a diagram showing an example of a search screen in the first embodiment in accordance with the present invention.
Figure 11:
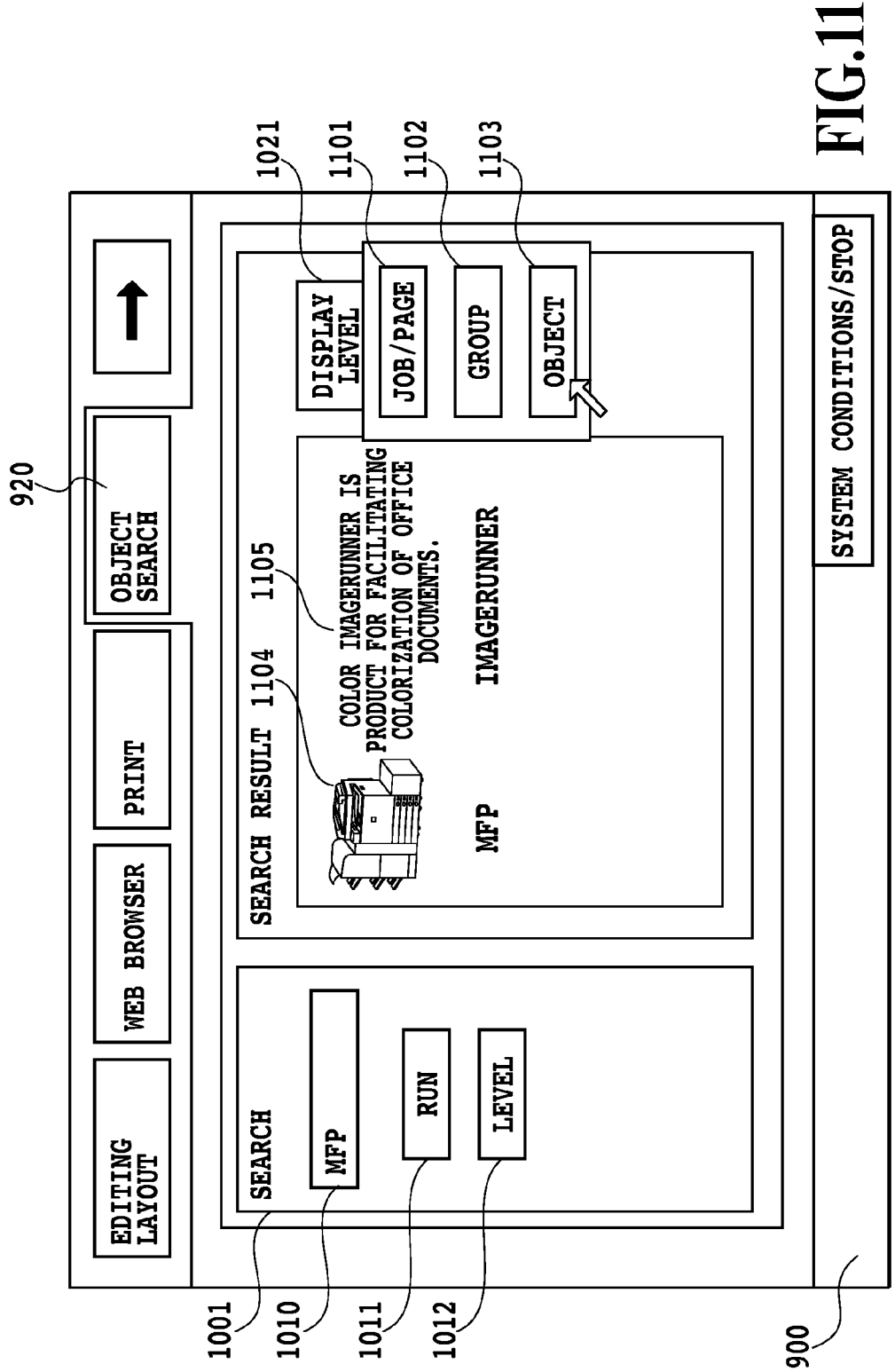
FIG. 11 is a diagram showing an example of the search screen in the first embodiment in accordance with the present invention.

FIG. 10 and FIG. 11 are each an example of a UI (user interface) for searching for an object data registered or spooled in the storage section 202.

An object search window 1001 is displayed on the expansion function operation screen 900 of FIG. 10, when the object search key 920 is pressed.

A search input bar 1010 of the object search window 1001 is a region for inputting a character string to search for the object data. The search for the object data is performed by inputting a search character string into the search input bar 1010 and by pressing an execution bar 1011. As the search character string, it is possible to designate a character string such as the name of the object, which can specify the object data or which is included in its metadata and can specify the object. In addition, before executing the search for the object data, a search level can be designated with a level bar 1012 as a search type. When the cursor is moved to the level bar 1012, a job/page level bar 1013, group level bar 1014 and object level bar 1015 are displayed so that one of them can be selected by moving the cursor. According to the level selected, the search is executed by the object search processing which will be described later. Here, the job/page level is for an object contained in the job or page; the group level is for a plurality of objects having relationship; and the object level is for a single object.

By pressing a display level bar 1021 of FIG. 11, a job/page level bar 1101, group level bar 1102, and object level bar 1103 are displayed; and by moving the cursor, the display is switched by search result display level switching processing which will be described later.

[Object Search]

Figure 14A:
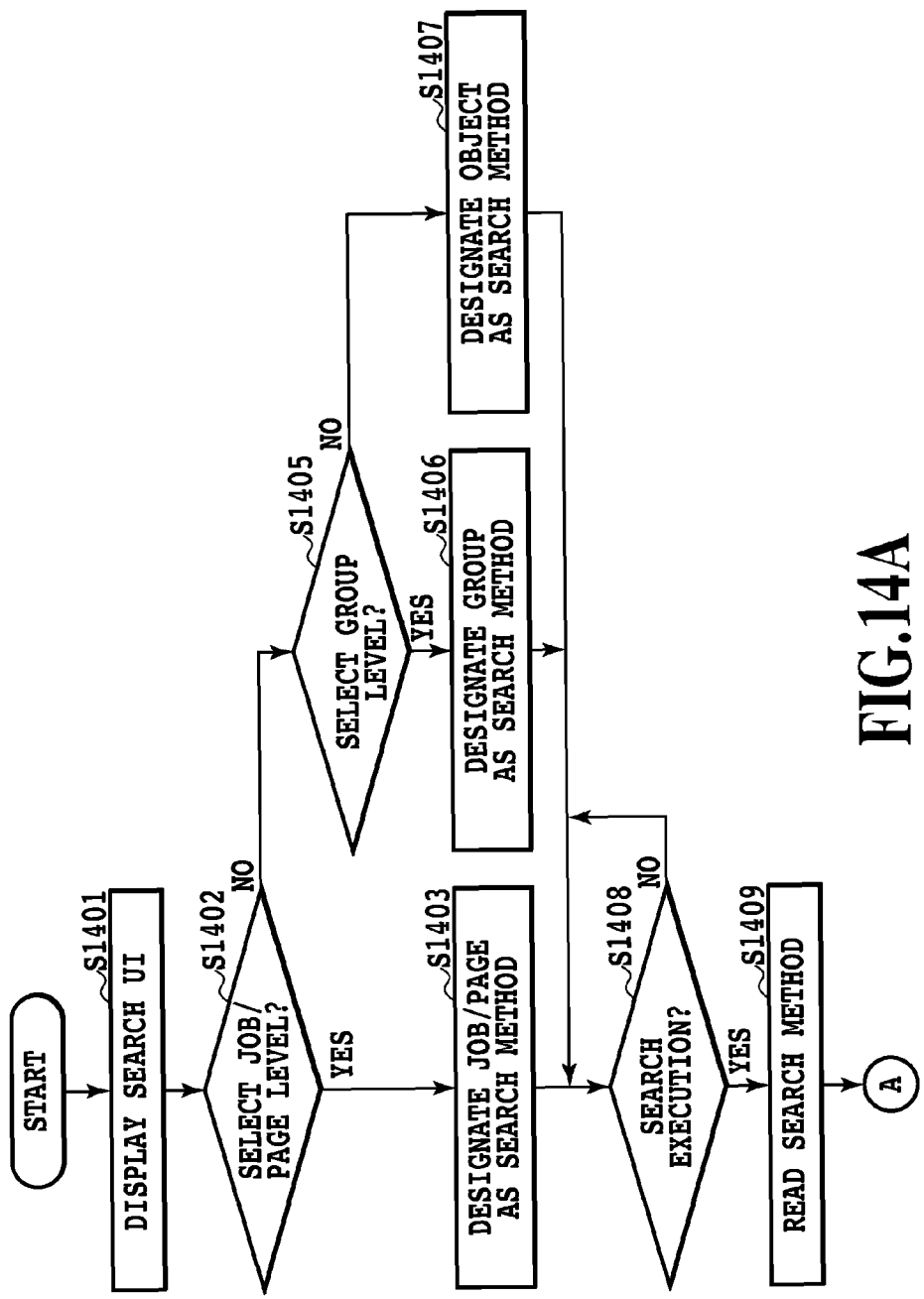
FIGS. 14A and 14B are a flowchart of search processing in the first embodiment in accordance with the present invention.
Figure 14B:
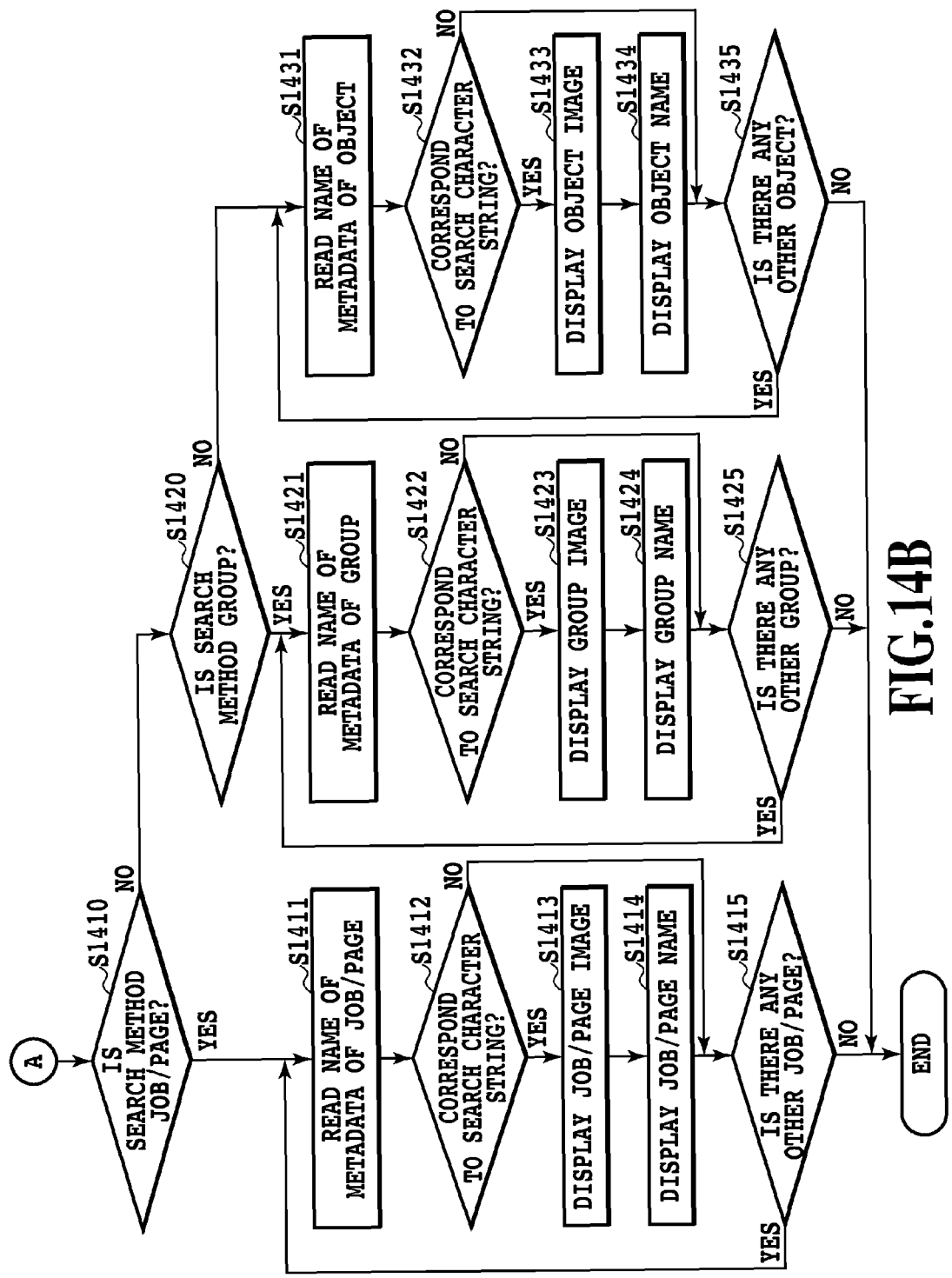

FIGS. 14A and 14B are flowcharts of the object search processing. First, at step S1401, the search window 1001 shown in FIG. 10 is displayed. At step S1402, if the cursor is moved to the level bar 1012 in response to user operation and the selection of the job/page level bar 1013 is detected, the job/page level search designation is retained as the search method at step S1403. If the group level bar 1014 is selected instead of the job/page level bar 1013 (S1405), the group level search designation is retained as the search method at step S1406.

On the other hand, if the object level bar 1015 is selected instead of the job/page level bar 1013 or group level bar 1014, the object level search designation is retained as the search method at step S1407.

Subsequently, if it is detected at step S1408 that the search execution bar 1011 is operated by the user, the retained search method is read at step S1409. Subsequently, if a decision is made at step S1410 that the search method read previously at step S1409 is a job/page level search, the name of the metadata including "JOB" in the object ID (1312 of FIG. 13B, for example) is read at step S1411.

If a decision is made at step S1412 that the name corresponds to the character string input into the search input bar 1010, the image of the job/page is displayed in the search result window 1002 at step S1413, and the name in the metadata is displayed in the search result window 1002 at step S1414. Then, the processing proceeds to step S1415. On the other hand, unless a decision is made at step S1412 that the name corresponds to the character string input into the search input bar 1010, the processing proceeds to step S1415 as well. At step S1415, a check is made whether undecided job/page is present, and if it is present, the processing loops back to step S1411.

If a decision is made at step S1420 that the search method read at step S1409 is not the job/page level search but a group level search, the name of the metadata including "GR" in the object ID is read at step S1421. Subsequently, if a decision is made at step S1422 that the name corresponds to the character string input via the search bar 1010, the image 1020 belonging to the group is displayed in the search result window 1002 at step S1423. In this case, the name 1022 in the metadata is also displayed in the search result window 1002 at step S1424. Then, the processing proceeds to step S1425. On the other hand, unless a decision is made at step S1422 that the name corresponds to the character string input via the search input bar 1010, the processing proceeds to step S1425 as well to further check whether any group is present, and if present, the processing loops back to step S1421.

If a decision is made at step S1420 that the search method read at step S1409 is not the job/page level search nor group level search, but an object level search, the name of the metadata including "OBJ" in the object ID is read at step S1431. Subsequently, if a decision is made at step S1432 that the name corresponds to the character string input via the search bar 1010, the image of the object is displayed in the search result window 1002 at step S1433. In addition, the name in the metadata is also displayed in the search result window 1002 at step S1434. Then, the processing proceeds to step S1435. On the other hand, unless a decision is made at step S1432 that the name corresponds to the character string input via the search input bar 1010, the processing proceeds to step S1435 as well to further check whether any object is still present, and if any other object is present, the processing loops back to step S1431.

[Search Result Display Level Switching]

Figure 15:
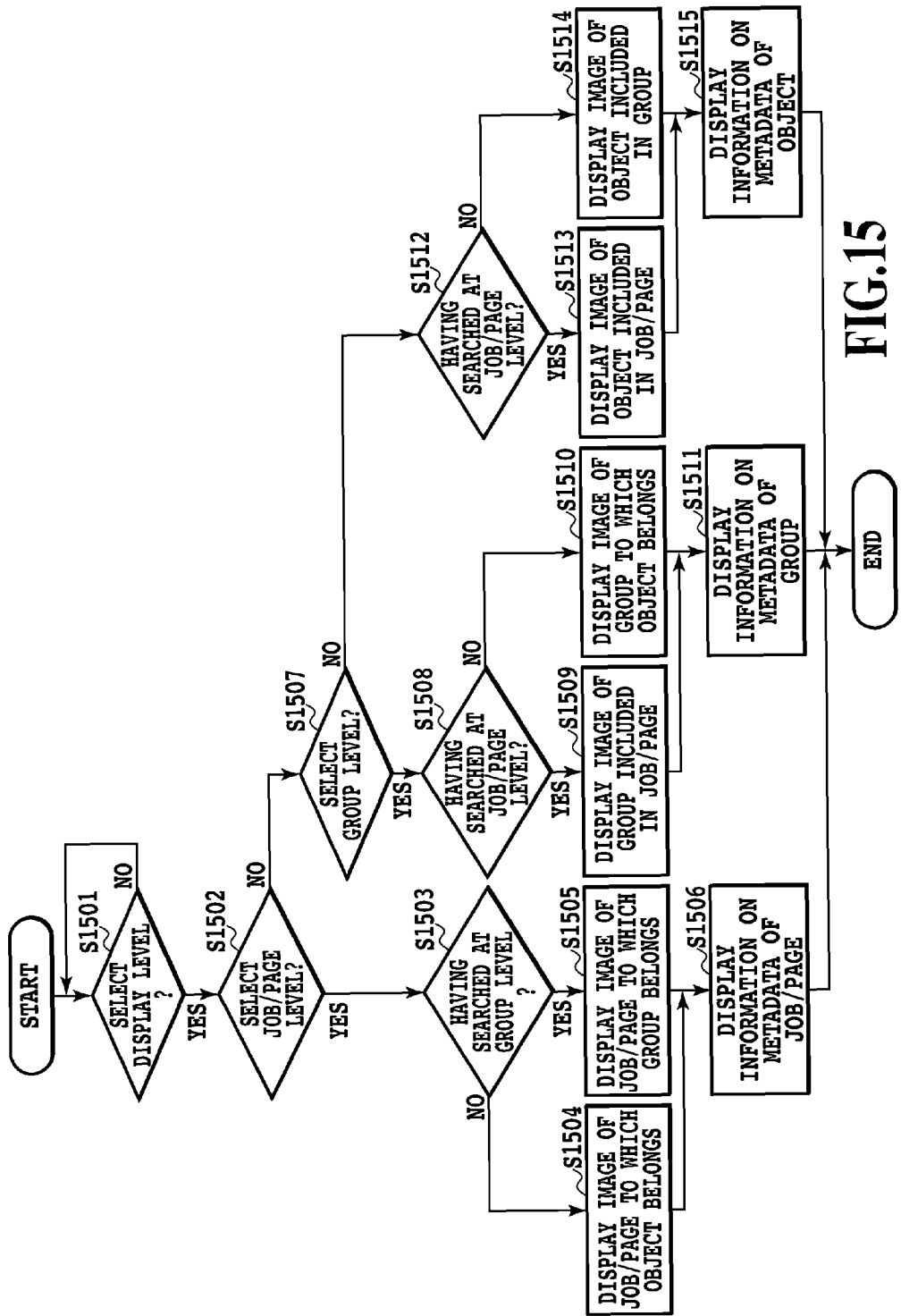
FIG. 15 is a flowchart of search display switching processing in the first embodiment in accordance with the present invention.

FIG. 15 is a flowchart of search result display level switching. First, when it is detected at step S1501 that the display level is selected; a decision is made as to whether the selected display level is the job/page level (S1502), and whether the search result that has already been displayed has been searched at the group level (S1503). If these decisions are positive (Yes), the image of the job/page to which the group belongs is displayed in the search result window 1002 at step S1505. On the other hand, if the search has been conducted at the object level, the image of the job/page to which the object belongs is displayed in the search result window 1002 at step S1504. At step S1506, the information on the metadata of the job/page is displayed in the search result window 1002 in addition to the display of the image at step S1504 or S1505.

On the other hand, if the selected display level is not the job/page level but the group level, and the search result that has already been displayed has been searched at the job/page level (Yes at each of the decisions at S1507 and S1508), the processing proceeds to step S1509. At step S1509, the image of the group contained in the job/page is displayed in the search result window 1002. On the other hand, if the search has been conducted at the object level, the image of the group to which the object belongs is displayed in the search result window 1002 at step S1510. Furthermore, at step S1511, the information on the metadata of the group is displayed in the search result window 1002 in addition to the display of the image at step S1509 or S1510.

On the other hand, if the selected display level is neither the job/page level nor the group level, but an object level, and the search result that have already been displayed have been searched at the job/page level (Yes in the decision at S1512), the processing proceeds to step S1513. At step S1513, the image of the object contained in the job/page is displayed in the search result window 1002. On the other hand, if the search has been conducted at the group level, the image of the object contained in the group is displayed in the search result window 1002 at step S1514. Furthermore, at step S1515, the information on the metadata of the object is displayed in the search result window 1002 in addition to the display of the image at step S1513 or S1514.

As described above, the display contents of the search result can be changed in accordance with the switching of the display level.

[Second Embodiment]

Figure 16:
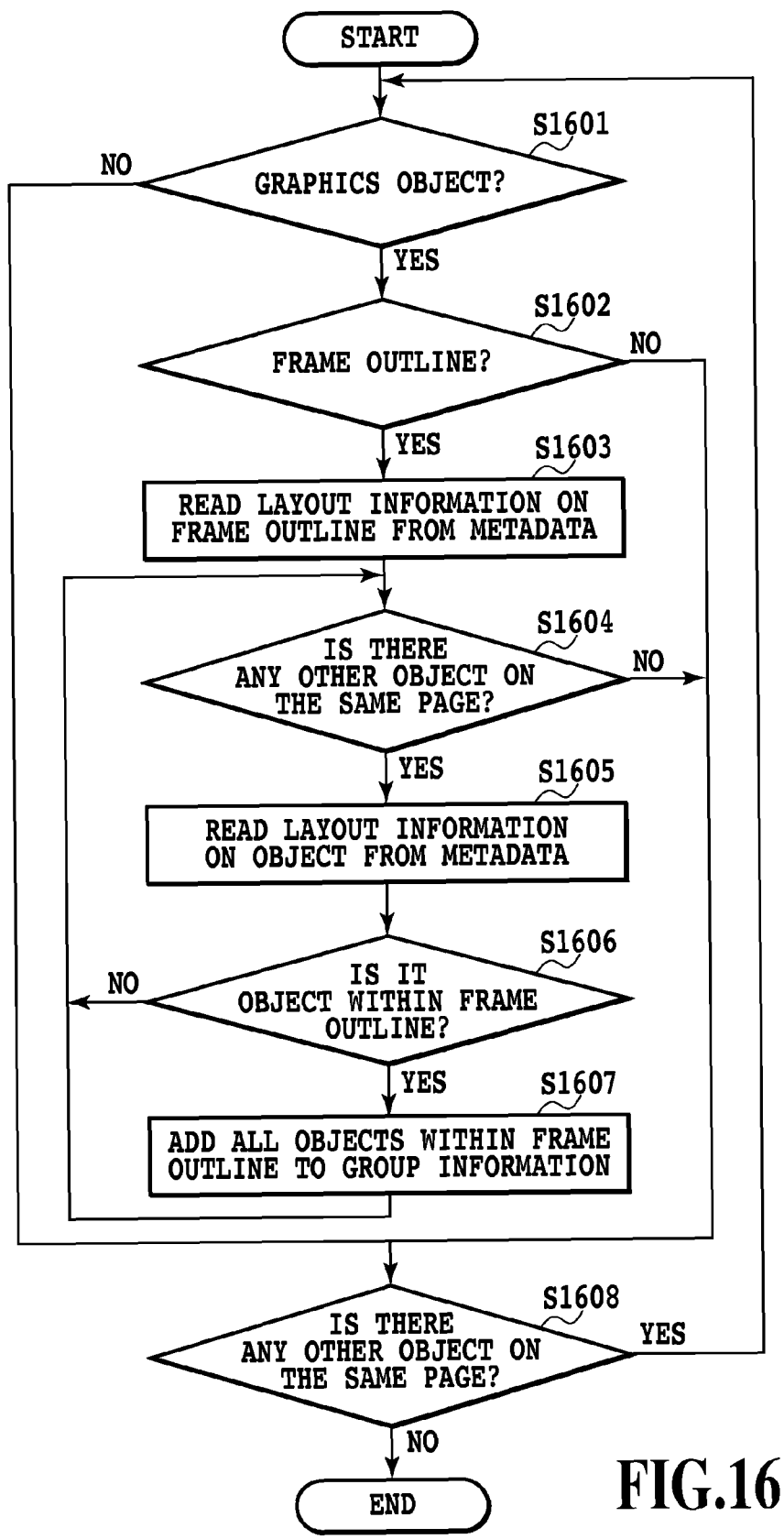
FIG. 16 is a flowchart of group information generating processing in a second embodiment in accordance with the present invention.
Figure 17:
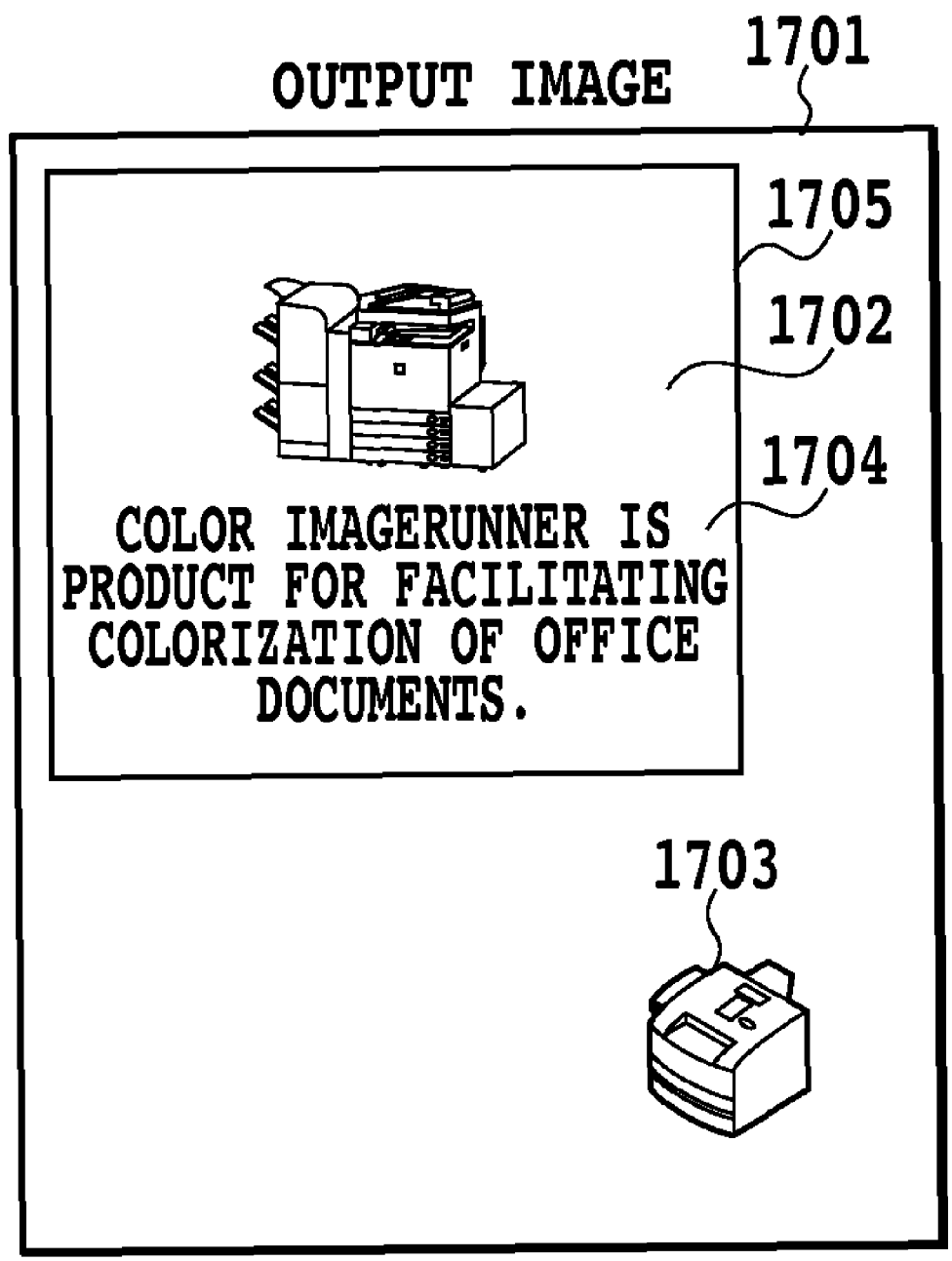
FIG. 17 is a diagram showing an example of an original document (output image) in the second embodiment in accordance with the present invention.
Figure 18:
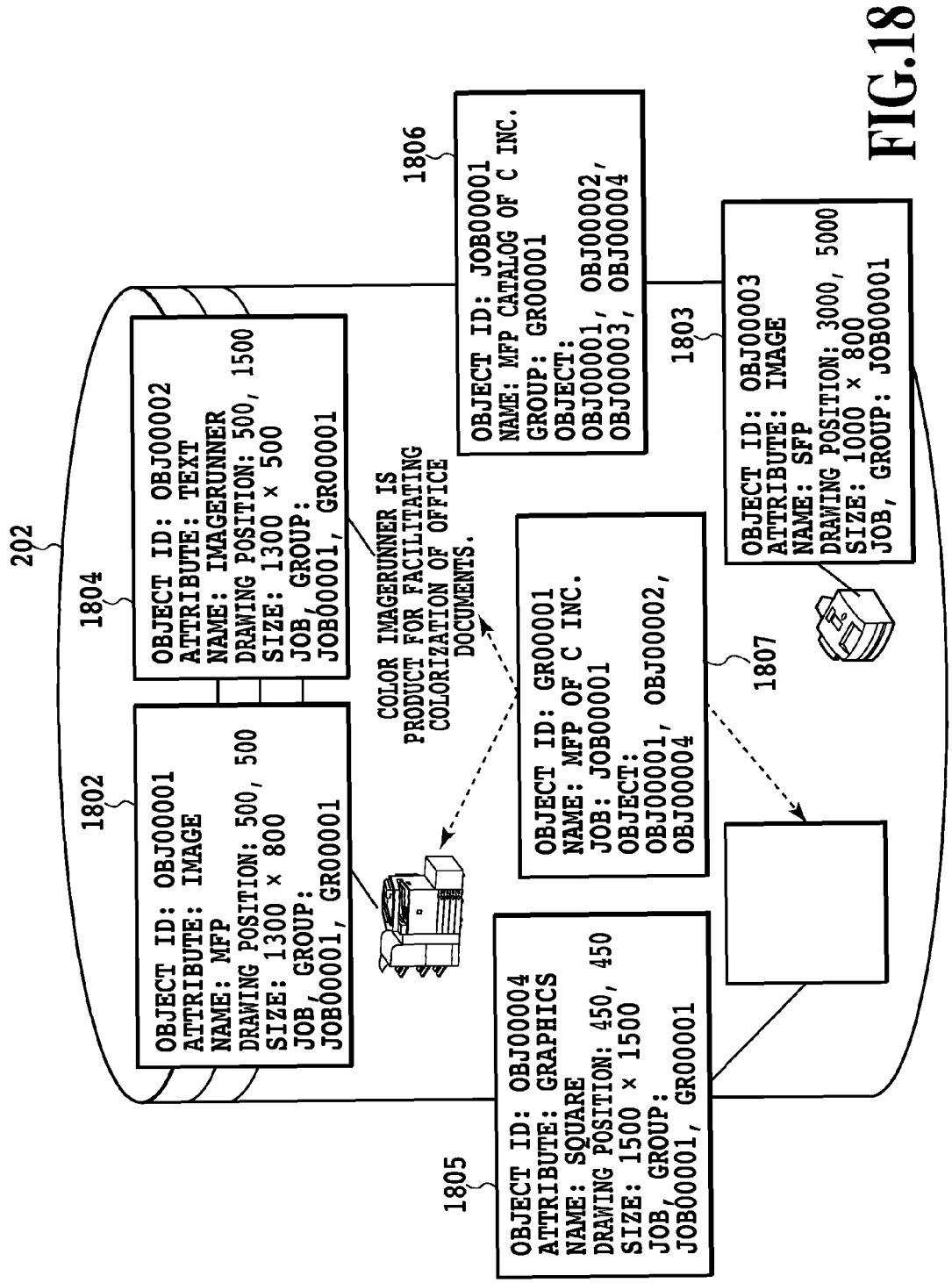
FIG. 18 is a diagram showing an example of the metadata of the registered or spooled object data in the second embodiment in accordance with the present invention.

Next, the second embodiment in accordance with the present invention will be described in detail with reference to the drawings. FIG. 16 is a flowchart of the group information generating processing in the second embodiment. FIG. 17 shows an example of an output image 1701 of the original document that is read in advance. FIG. 18 is an example of the metadata of the object data that is prepared by reading the output image 1701 in FIG. 17 in advance and by storing in the storage section 202. Since the remaining configuration and processing contents are the same as those of the foregoing first embodiment, the detailed descriptions of the common portions are omitted here.

In the present embodiment, at the time of generating the group information, a determination of the group is made using the inclusion relation of object regions. Here, the output image 1701 of FIG. 16 consists of the objects 1702, 1703, 1704, and 1705.

[Group Information Generating Processing]

First, the attribute information of the metadata 1802 of the object 1702 is read, and a decision is made whether it is a graphic object or not (S1601). Since the attribute of the object 1702 of the output image 1701 is image, the processing proceeds to step S1608. At step S1608, a decision is made as to whether any other object is present on the same page. Since other objects are present in this case, the processing loops back to step S1601 to perform the same processing with regard to the other objects.

Next, assume that the object 1705 is checked. Since the attribute of the object 1705 is graphics, a check is made at the next step S1602 whether it is a frame outline of a closed region or not. It can be decided easily as to whether it is the frame outline of the closed region or not by checking the individual points of the vectorized object. If a decision is made that the object 1705 is the frame outline of the closed region, the name of the object and the layout information such as the drawing position and size are read from the metadata 1805 on the object 1705 at step S1603. The drawing position of the object 1705 is (450, 450) and its size is 1500×1500.

Subsequently, a check is made whether any other object is contained on the same page or not at step S1604. The output image 1701 contains the object 1702, 1703 and 1704. At step S1605, the drawing position and size of the metadata 1802 on the object 1702 are read.

Subsequently, at step S1606, a decision is made as to whether the object 1702 is included in the region of the object 1705. Since the object 1702 is included in the region of the object 1705, the processing proceeds to step S1607. At step S1607, the metadata 1807 that will become the group information is generated, and the object IDs of the frame outline and of the object within the frame outline (object 1702, here) are added and registered to the group information. On the other hand, unless a decision is made at step S1606 that the object is an object within the region, the step loops back to step S1604. As for the other objects on the same page (1703 and 1704, here), the same processing is carried out. In the end, the object IDs of the objects 1702, 1704 and 1705 except for the object 1703 outside the region are registered as the group information. The group information includes the object ID indicating the group (GR00001 in this case) and its name, and the object IDs of all the objects related as the group.

[Other Embodiments]

The present invention is further applicable not only to a system consisting of a plurality of devices (such as a computer, an interface unit, a reader and a printer), but also to an apparatus consisting of a single device (such as a multifunction machine, a printer or a fax machine).

In addition, the object of the present invention can be achieved by storing a program code for implementing the procedures of the flowcharts shown in the embodiments described above, and by reading and executing the program code with a computer (or CPU or MPU) of the system or apparatus. In this case, the program code itself read from the storage medium implements the functions of the foregoing embodiments. Accordingly, the program code or a computer readable storage medium that stores/records the program code constitutes the present invention as well.

As a storage medium for storing the program code, a floppy disk, hard disk, optical disk, magneto-optical disk, CD-ROM, CD-R, magnetic tape, nonvolatile memory card, ROM and the like can be used.

The functions of the foregoing embodiments are implemented by executing the read-out program with the computer. In addition, the term "execution of the program" includes the case where an OS and the like working on the computer perform part or all of the actual processing according to the instructions of the program.

Furthermore, the functions of the foregoing embodiments can also be implemented by a function expansion board inserted into a computer or a function expansion unit connected to the computer. In this case, the program read out of the storage medium is written into a memory in the expansion board inserted to the computer or into a memory in the expansion unit connected to the computer. After that, according to the instructions of the program, the CPU in the expansion board or in the expansion unit executes part or all of the actual processing. Such processing by the function expansion board or function expansion unit can also implement the functions of the foregoing embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-203425, filed Aug. 3, 2007, which is hereby incorporated by reference herein in its entirety.

What is claimed is:

1. An image processing apparatus which extracts a plurality of objects contained in input image data, and stores the objects in a storage device, said image processing apparatus comprising:

a first generating unit configured to generate a plurality of pieces of first information of a specific type and to associate the plurality of pieces of first information with respective ones of the plurality of objects;

a detecting unit configured to detect a relationship of two or more of the plurality of objects;

a second generating unit configured to generate a plurality of pieces of second information of the specific type and to associate the plurality of pieces of second information with respective different groups of the objects which have the relationship detected by said detecting unit;

an inputting unit configured to input a query of the specific type for searching the objects;

a selecting unit configured to select a search level, based on a user's instruction, from a plurality of different search levels including at least an object level targeting a single object, where the first information is used, and a group level targeting a plurality of objects having a relationship, where the second information is used;

a searching unit configured to,
  in a case where the object level is selected by said selecting unit, search the pieces of first information for a match of the query and identify the object associated with the matching piece of first information, and
  in a case where the group level is selected by said selecting unit, search the pieces of second, information for a match of the query and identify the object(s) associated with the matching piece of second information; and a display unit configured to display the one or more objects identified by said searching unit.

2. The image processing apparatus as claimed in claim 1, wherein said detecting unit detects the relationship according to a name, size and position of the objects.

3. The image processing apparatus as claimed in claim 1, wherein said detecting unit detects the relationship according to an inclusion relation between regions of the individual objects.

4. The image processing apparatus as claimed in claim 1, wherein the second information includes at least information for specifying a related object.

5. The image processing apparatus as claimed in claim 1, wherein said selecting unit selects the search level from the plurality of search levels consisting of a job or page level targeting one or more objects constituting a job or page, the group level targeting a plurality of objects having a relationship, and the object level targeting a single object.

6. The image processing apparatus as claimed in claim 1, wherein said display unit comprises a display level setting unit configured to set a display level specifying how objects are to be displayed, wherein said display unit changes display contents in accordance with the search level selected by said selecting unit and the display level set by said display level setting unit.

7. An image processing method executed by a data processing section of an image processing apparatus which extracts a plurality of objects contained in input image data, and stores the objects in a storage device, said image processing method comprising:
   a first generating step of generating a plurality of pieces of first information of a specific type and associating the plurality of pieces of first information with respective ones of the plurality of objects;
   a detecting step of detecting a relationship of two or more of the plurality of objects;
   a second generating step of generating a plurality of pieces of second information of the specific type and associating the plurality of pieces of second information with respective different groups of the objects which have the relationship detected in said detecting step;
   an inputting step of inputting a query of the specific type for searching objects;
   a selecting step of accepting selection of a search level, based on a user's instruction, from a plurality of different search levels, including at least an object level targeting a single object, where the first information is used, and a group level targeting a plurality of objects having a relationship, where the second information is used;
   a search step of,
      in in a case where the object level is selected in said selecting step, searching the pieces of first information for a match of the query and identifying the object associated with the matching piece of first information, and
      in a case where the group level is selected in said selecting step, searching the pieces of second information for a match of the query and identifying the object(s) associated with the matching piece of second information; and
   a step of displaying real data of the one or more objects identified in said searching step.

8. A non-transitory computer-readable storage medium that records, in executable form, a program to be executed by a data processing section of an image processing apparatus which extracts a plurality of objects contained in input image data, and stores the objects in a storage device, said program causing the data processing section to execute:
   a first generating step of generating a plurality of pieces of first information of a specific type and associating the plurality of pieces of first information with respective ones of the plurality of objects;
   a detecting step of detecting a relationship of two or more of the plurality of objects;
   a second generating step of generating a plurality of pieces of second information of the specific type and associating the plurality of pieces of second information with respective different groups of the objects which have the relationship detected in said detecting step;
   an inputting step of inputting a query of the specific type for searching the objects;
   a selecting step of accepting selection of a search level, based on a user's instruction, from a plurality of different search levels, including at least an object level targeting a single object, where the first information is used, and a group level targeting a plurality of objects having a relationship, where the second information is used;
   a searching step of,
      in a case where object level is selected in said selecting step searching the pieces of first information for a match of the query and identifying the object associated with the matching piece of first information, and
      in a case where the group level is selected in said selecting step, searching the pieces of second information for a match of the query and identifying the object(s) associated with the matching piece of second information; and
   a step of displaying real data of the one or more objects identified in said searching step.

* * * * *